(12) United States Patent
Chen et al.

(10) Patent No.: US 11,227,226 B2
(45) Date of Patent: Jan. 18, 2022

(54) UTILIZING JOINT-PROBABILISTIC ENSEMBLE FORECASTING TO GENERATE IMPROVED DIGITAL PREDICTIONS

(71) Applicant: Adobe Inc., San Jose, CA (US)

(72) Inventors: Eugene Chen, Fremont, CA (US); Zhenyu Yan, Cupertino, CA (US); Xiaojing Dong, Santa Clara, CA (US)

(73) Assignee: ADOBE INC., San Jose, CA (US)

(*) Notice: Subject to any disclaimer, the term of this patent is extended or adjusted under 35 U.S.C. 154(b) by 1075 days.

(21) Appl. No.: 15/783,223

(22) Filed: Oct. 13, 2017

(65) Prior Publication Data

US 2019/0114554 A1   Apr. 18, 2019

(51) Int. Cl.
*G06N 7/00*    (2006.01)
*G06N 5/04*    (2006.01)

(52) U.S. Cl.
CPC ............ *G06N 7/005* (2013.01); *G06N 5/046* (2013.01)

(58) Field of Classification Search
CPC ........ G06N 20/20; G06N 5/046; G06N 7/005; G06Q 10/04
See application file for complete search history.

(56) References Cited

PUBLICATIONS

Tilmann Gneiting, Adrian E Raftery, Anton H Westveld III, and Tom Goldman. Calibrated probabilistic forecasting using ensemble model output statistics and minimum crps estimation. Monthly Weather Review, 133(5):1098-1118, 2005. (Year: 2005).*

Glahn et al., "MOS Uncertainty Estimates in an Ensemble Framework," Monthly Weather Review, vol. 137: issue 1, pp. 246-268 (2009) (Year: 2009).*

Kobayashi, "Bayesian Nonparametric Instrumental Variable Regression Approach to Quantile Inference," arXiv:1608.07921v1 [stat.ME] Aug. 29, 2016 (Year: 2016).*

O'Brien et al., "A fast and objective multidimensional kernel density estimation method: fastKDE," Computational Statistics and Data Analysis 101 (2016) 148-160 (Year: 2016).*

Liao et al., Wind Power Prediction Errors Model and Algorithm Based on Non-parametric Kernel Density Estimation, Preprints of the 5th international conference on Electric Utility Deregulation and Restructuring and Power Technologies, Nov. 26-29, 2015. Changsha, China. (Year: 2015).*

(Continued)

*Primary Examiner* — Miranda M Huang
*Assistant Examiner* — Yao D Huang
(74) *Attorney, Agent, or Firm* — Keller Jolley Preece

(57) ABSTRACT

Methods, systems, and computer readable storage media are disclosed for generating joint-probabilistic ensemble forecasts for future events based on a plurality of different prediction models for the future events. For example, in one or more embodiments the disclosed system determines error values for various predictions from a plurality of different prediction models (i.e., "forecasters") for previous events. Moreover, in one or more embodiments the system generates an error probability density function by mapping the error values to an error space and applying a kernel density estimation. Furthermore, the system can apply the error probability density function(s) to a plurality of predictions from the forecasters for a future event to generate a likelihood function and a new prediction for the future event.

20 Claims, 13 Drawing Sheets

(56) References Cited

PUBLICATIONS

Cagdas Hakan Aladag, Erol Egrioglu, and Ufuk Yolcu. Forecast combination by using artificial neural networks. Neural Processing Letters, 32(3):269-276, 2010.

J Scott Armstrong. Combining forecasts. In Principles of forecasting, pp. 417-439. Springer, 2001.

John M Bates and Clive WJ Granger. The combination of forecasts. Journal of the Operational Research Society, 20(4):451-468, 1969.

Derek W Bunn. A bayesian approach to the linear combination of forecasts. Journal of the Operational Research Society, 26(2):325-329, 1975.

Richard M Chmielecki and Adrian E Raftery. Probabilistic visibility forecasting using bayesian model averaging. Monthly Weather Review, 139(5):1626-1636, 2011.

Robert T Clemen. Combining forecasts: A review and annotated bibliography. International journal of forecasting, 5(4):559-583, 1989.

Lilian M De Menezes, Derek W Bunn, and James W Taylor. Review of guidelines for the use of combined forecasts. European Journal of Operational Research, 120(1):190-204, 2000.

JP Dickinson. Some statistical results in the combination of forecasts. Journal of the Operational Research Society, 24(2):253-260, 1973.

Francis X Diebold. Serial correlation and the combination of forecasts. Journal of Business & Economic Statistics, 6(1):105-111, 1988.

Francis X Diebold, Todd A Gunther, and Anthony S Tay. Evaluating density forecasts. International Economic Review, 39(4):863-883, 1998.

Vassiliy A Epanechnikov. Non-parametric estimation of a multivariate probability density. Theory of Probability & Its Applications, 14(1):153-158, 1969.

Paulo SA Freitas and Antonio JL Rodrigues. Model combination in neural-based forecasting. European Journal of Operational Research, 173(3):801-814, 2006.

Tilmann Gneiting, Adrian E Raftery, Anton H Westveld III, and Tom Goldman. Calibrated probabilistic forecasting using ensemble model output statistics and minimum crps estimation. Monthly Weather Review, 133(5):1098-1118, 2005.

Clive WJ Granger and Ramu Ramanathan. Improved methods of combining forecasts. Journal of forecasting, 3(2):197-204, 1984.

Gerald J Lobo. Alternative methods of combining security analysts' and statistical forecasts of annual corporate earnings. International Journal of Forecasting, 7(1):57-63, 1991.

Adrian E Raftery, Tilmann Gneiting, Fadoua Balabdaoui, and Michael Polakowski. Using bayesian model averaging to calibrate forecast ensembles. Monthly Weather Review, 133(5):1155-1174, 2005.

Allan Timmermann. Forecast combinations. Handbook of economic forecasting, 1:135-196, 2006.

* cited by examiner

UTILIZING JOINT-PROBABILISTIC ENSEMBLE FORECASTING TO GENERATE IMPROVED DIGITAL PREDICTIONS

BACKGROUND AND RELEVANT ART

Recent years have seen significant improvement in computer systems for generating digital forecasts. Indeed, developers have created various hardware and software platforms for determining digital forecasts related to digital software performance, user interaction with digital systems, or even digital forecasts related to weather patterns or business performance.

Often times, digital forecasting systems use a plurality of prediction models (i.e., different "forecasters") to increase the probability of generating accurate digital forecasts. In particular, some conventional digital forecasting systems combine predictions from different forecasters (often referred to as "ensemble forecasting") to generate more accurate digital forecasts than predictions resulting from any single prediction model. Specifically, conventional ensemble digital forecasting systems typically use regression-based algorithms or Bayesian Model Averaging for determining weights to apply to digital forecasting models based on the past accuracy of forecaster predictions. For example, conventional ensemble digital forecasting systems can determine and apply weights that emphasize more accurate prediction models and de-emphasize less accurate prediction models.

While conventional digital forecasting systems that utilize ensemble forecasting algorithms tend to generate more accurate digital predictions than individual digital prediction models in isolation, these conventional systems still suffer from a variety of problems. For example, in order to generate a digital prediction, conventional digital forecasting systems often make a number of rigid assumptions that limit accuracy and applicability.

To illustrate, many conventional digital forecasting systems assume that the forecasting error distributions in different digital prediction models and/or the combined model follow a certain form (e.g., a Gaussian distribution). Similarly, conventional digital forecasting systems often assume that the distribution of forecasting errors from one digital prediction model are independent of the forecasting errors in the other digital prediction models or that their dependency can be sufficiently captured by a small set of parameters (e.g., correlations). Although these assumptions are necessary in many conventional digital forecasting systems in generating the prediction from multiple forecasters, they limit the applicability of the conventional digital forecasting systems and would not be appropriate in a wide variety of forecasting scenarios (e.g., where error distributions for digital prediction models do not conform to an assumed form, or where two or more forecasters have some complicated dependency that can only be described by a joint-probability distribution. Furthermore, because many prediction models do not conform to these assumptions, conventional digital forecasting systems often generate inaccurate digital forecasts in combining prediction models.

These and other disadvantages exist with respect to conventional digital ensemble forecasting systems.

SUMMARY

One or more embodiments provide benefits and/or solve one or more of the foregoing or other problems in the art with systems, methods, and computer readable storage media for generating digital predictions of future events based on joint-probabilistic ensemble forecasts. In particular, in one or more embodiments, the disclosed system generates an error probability distribution function that reflects, in a single model, the joint-probability of obtaining different error values from multiple different forecasters. Utilizing the probability distribution function, the disclosed systems can generate a new prediction from the different forecasters regardless of the form (or type) of error distribution associated with each forecaster. Furthermore, based on the probability distribution function the disclosed systems can also generate a new prediction that accounts for arbitrary co-dependency across different forecasters. Accordingly, the disclosed systems are more flexible, broadly applicable, and accurate than conventional digital forecasting systems.

For example, in one or more embodiments, the disclosed system uses predictions from a plurality of forecasters for a plurality of previous events to determine error values for the predictions. Specifically, the disclosed system obtains the error values by comparing the predictions to ground truth values for the plurality of previous events. The disclosed system then generates at least one error probability density function (e.g., a function representing probabilities of obtaining error values) by mapping the error values of the forecasters to an error space and applying a kernel density estimation to the error space. Additionally, the disclosed system applies the error probability density function(s) to the predictions for a future event from the forecasters to generate a likelihood function (i.e., a likelihood function reflecting the probability of various actual values given the predictions for the future event from the forecasters). Furthermore, the system utilizes (e.g., maximizes) the likelihood function to generate a new prediction. Accordingly, the systems, methods, and computer readable storage media can use predictions from a plurality of forecasters for previous events to generate more accurate ensemble forecasts for future events without the rigid limitations of conventional systems.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

Various embodiments will be described and explained with additional specificity and detail through the use of the accompanying drawings in which.

DETAILED DESCRIPTION

Figure 1:
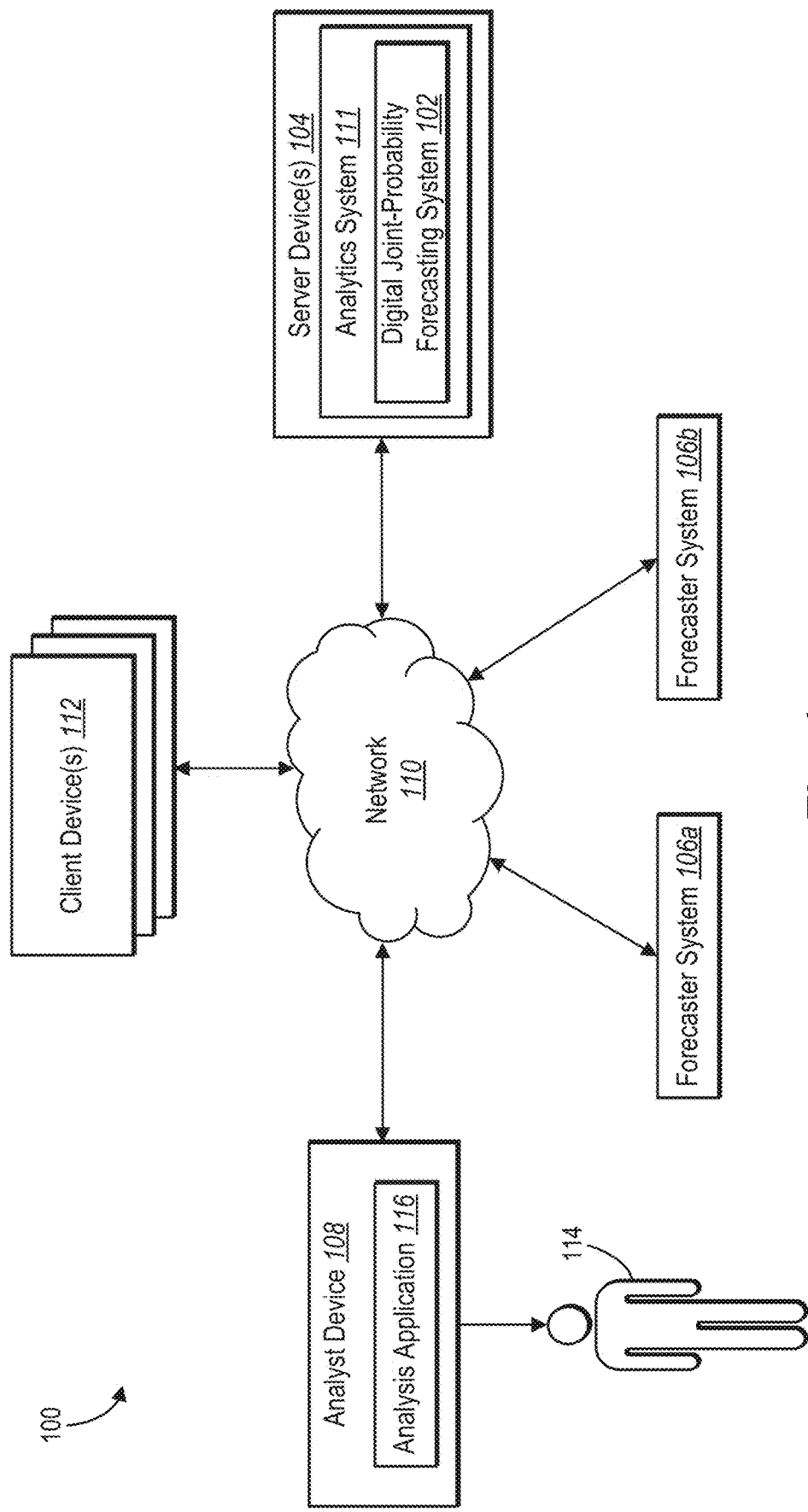
FIG. 1 illustrates an environment in which a digital joint-probability forecasting system can operate in accordance with one or more embodiments.

One or more embodiments of the present disclosure include a digital joint-probability forecasting system that generates an ensemble prediction for a future event by generating a probability distribution function utilizing predictions from a plurality of forecasters. Specifically, the digital joint-probability forecasting system can generate a probability distribution function that reflects the joint-probability of obtaining error values from multiple different forecasters for any given event. The digital joint-probability forecasting system can then utilize the joint probability distribution function together with additional predictions from forecasters for future events to generate new, more accurate predictions for the future events.

For example, in one or more embodiments, the digital joint-probability forecasting system determines error values for predictions by comparing predictions from a plurality of forecasters to ground truth values (i.e., actual recorded values) for the previous events. The digital joint-probability forecasting system then generates one or more error probability density functions by mapping the error values from each forecaster to an error space and applying a kernel density estimation to the error space. Upon obtaining additional predictions from the plurality of forecasters for a future event, the digital joint-probability forecasting system utilizes the error probability density function(s) to generate a likelihood function (i.e., a function that reflects the probability of possible values for the future event). Furthermore, the digital joint-probability forecasting system then utilizes the likelihood function to determine a new prediction for the future event. By using probability density function(s) that map error values of previous predictions to an error space for creating a likelihood function, the digital joint-probability forecasting system generates ensemble forecasts with increased flexibility and accuracy.

As just mentioned, in one or more embodiments, the digital joint-probability forecasting system communicates with a plurality of forecasters to obtain predictions of events. For example, each forecaster can provide a prediction to the digital joint-probability forecasting system for an event (e.g., a specific time period or other measurable, discrete moment). Once the event has occurred (e.g., the time period has passed), the digital joint-probability forecasting system can obtain a ground truth value for the event to compare with the predictions from the plurality of forecasters and determine error values for the predictions. Accordingly, the digital joint-probability forecasting system can determine error values for the forecasters across a plurality of previous events using the ground truth values for the previous events.

Additionally, in one or more embodiments, the digital joint-probability forecasting system generates at least one error probability density function representing the probabilities of obtaining error values in predictions from the forecasters. Specifically, the digital joint-probability forecasting system can map error values from forecasters to an error space and apply a kernel density estimation to the error space to generate an error probability density function.

Because the amount of data required to generate an accurate joint error probability density function varies significantly based on dimensionality (i.e., the number of forecasters reflected in error values within a multi-dimensional error space), in some embodiments, the digital joint-probability forecasting system selects a dimensionality based on the amount of data available and the number of forecasters. In particular, the digital joint-probability forecasting system can map the error values from the plurality of forecasters to an error space based on the number of forecasters and error values.

For example, if the digital joint-probability forecasting system has sufficient error values (relative to the number of forecasters), the digital joint-probability forecasting system can map sets of combined error values from a plurality of forecasters to a multi-dimensional error space and then apply a kernel density estimation to the multi-dimensional error space to generate an accurate error probability density function. On the other hand, if the digital joint-probability forecasting system does not have sufficient error values (based on the number of forecasters and other factors), the digital joint-probability forecasting system can map error values for each forecaster to a one-dimensional error space and apply a kernel density function to the error values for each forecaster. In such circumstances, the digital joint-probability forecasting system can generate and utilize a plurality of individual error probability density functions for each forecaster from the one-dimensional error space.

After generating the error probability density function(s), the digital joint-probability forecasting system can use the error probability density function(s) to identify the most likely values for any future event. Specifically, the digital joint-probability forecasting system can use the error probability density function with additional predictions from the forecasters for a future event to generate a likelihood function. The likelihood function represents the probabilities that a plurality of possible values corresponds to a ground truth value for the future event (in light of the additional predictions from the forecasters). Utilizing the likelihood function, the digital joint-probability forecasting system can generate a new ensemble prediction for the future event that takes into account past forecaster errors and predictions from the forecasters for the future event.

In one or more embodiments, the digital joint-probability forecasting system also uses a loss function in connection with the likelihood function to generate a new ensemble prediction for a future event. In particular, the digital joint-probability forecasting system can identify a loss function that represents a cost associated with the future event. For example, the loss function can be based on a risk threshold that indicates one or more constraints for generating the ensemble prediction. The digital joint-probability forecasting system can use the loss function in connection with the likelihood to minimize (or reduce) the cost while also maximizing (or increasing) the accuracy of the ensemble prediction. Accordingly, the digital joint-probability forecasting system can generate an accurate prediction that also reduces a risk associated with the prediction.

By generating ensemble forecasts using error probability density functions of error values for a plurality of forecasters, the digital joint-probability forecasting system is able to provide predictions of future events with increased flexibility and accuracy. Indeed, by generating one or more numerical error probability density function(s), in one or more embodiments, the digital joint-probability forecasting system can generate predictions for future events regardless of the underlying error distribution for any individual forecaster. For instance, the digital joint-probability forecasting system can accurately generate predictions for forecasters with non-Gaussian error distributions. Given the complexity of modern forecasters, the ability to accurately analyze such non-Gaussian forecasters significantly expands the flexibility and applicability of digital joint-probability forecasting system relative to conventional systems. Furthermore, the digital joint-probability forecasting system also increases accuracy of predictions with regard to these forecasters.

Similarly, by generating a joint probability distribution function in a multi-dimensional error space, the digital joint-probability forecasting system can also account for arbitrary dependency between forecasters. Specifically, the digital joint-probability forecasting system can generate a new prediction that not only accounts for the accuracy of each forecaster but the relative dependency in errors between the predictions generated by each forecaster. For example, the digital joint-probability forecasting system can account for two forecasters that both tend to generate predictions that are greater than ground truth. Again, because many forecasters tend to have some correlation or co-dependency, the digital joint-probability forecasting system provides increased flexibility, applicability, and accuracy when compared to conventional systems.

As mentioned above, the digital joint-probability forecasting system is also adaptable to high-dimensional cases (i.e., with a large number of forecasters), even with limited quantities of data (i.e., error values). By mapping error values to one-dimensional error spaces or multi-dimensional error spaces based on the number of forecasters and/or error values, the probability system can further improve flexibility over conventional systems. Specifically, the digital joint-probability forecasting system provides ensemble forecasts (or "ensemble predictions") for a variety of different subject categories without requiring analysts to wait until the forecasters generate greater amounts of data in cases involving large numbers of forecasters.

As used herein, the terms "forecaster" and "forecaster system" refer to an entity that generates predictions for events. In particular, a forecaster can include an entity that analyzes collected analytics data associated with previous events (i.e., events that have already occurred) to predict future events (i.e., events that have not yet occurred). For example, a forecaster can use trends or other predictive information to generate predictions for the future events. The digital joint-probability forecasting system can use a plurality of forecasters to generate an ensemble prediction that represents a combination of the predictions of all of the forecasters.

Also as used herein, the term "prediction" refers to an estimation of a value for an event. Specifically, a prediction can include a numerical value estimating an outcome of a future event. For example, a prediction can include an estimation of a number of user interactions from client devices for digital content (e.g., number of clicks), a number of conversions from client devices resulting from digital content, or a number of digital subscriptions gained or lost for a particular time period. Similarly, a prediction can include an estimation of price, sales, inventory, or weather during a particular time period.

As used herein, the term "event" refers to a measurable occurrence. For instance, an event can include a time period, a date, a range of dates, or other measurable moment. Furthermore, as used herein, the term "ground truth value" refers to an actual measured value for an event. Accordingly, a ground truth value for a previous event is a value that has been measured for the previous event, and a ground truth value for a future event is a value that will be measured after the future event occurs.

As used herein, the term "error value" refers to a difference between a prediction and a ground truth value for an event. In particular, an error value is a numerical value that the digital joint-probability forecasting system calculates by finding a difference between a predicted value for an event from a forecaster and a ground truth value collected for the event. Error values for a plurality of forecasters for an event can vary based on the forecasting models that each forecaster uses.

As used herein, the terms "probability density function" and "error probability density function" refer to a function that represents a distribution of error values from one or more forecasters. Specifically, an error probability density function is a density distribution of error values generated by applying a kernel density estimation (e.g., using an Epanechnikov kernel) to an error space. For example, an error probability density function can be a probability density function from sets of error values from multiple forecasters mapped as individual coordinates in a multi-dimensional error space (i.e., n dimensions for n forecasters). Alternatively, an error probability density function can be a probability density function from error values of a forecaster in a one-dimensional error space.

As used herein, the term "likelihood function" refers to a function that reflects probabilities that each possible value of a plurality of possible values correspond to a ground truth value for an event. In particular, the term likelihood function includes a function of probabilities that a plurality of possible values corresponds to a ground truth value for a future event given a set of predictions for the future event from a plurality of forecasters. For example, a likelihood function can be a function generated from one or more error probability density functions for generating an ensemble prediction for a future event. In one or more embodiments, the likelihood function can be constructed from (with the set of future predictions from all involved individual forecasters) the product of a set of error probability density functions in one-dimensional error spaces or from an error probability density function in a multi-dimensional error space.

As used herein, the term "loss function" refers to a model of cost for a future event. For example, a loss function can indicate a model of cost resulting from errors in a prediction for a future event (e.g., a model provided by an analyst or user requesting an ensemble prediction). Additionally, a loss function can be based on a strategic model (e.g., strategic business logic model or risk model) that a user has provided to constrain the ensemble prediction to reduce the subjective or objective risks associated with overestimating or underestimating a ground truth value for a future event. For example, a loss function can include a measure of lost revenue based on an inaccurate prediction of client device interactions with digital content for a period of time.

Referring now to the figures, FIG. 1 illustrates an embodiment of an environment 100 in which a digital joint-probability forecasting system 102 operates. Specifically, the environment 100 includes server device(s) 104, forecaster systems 106a, 106b, an analyst device 108, and client device(s) 112 communicating over a network 110. Although the environment 100 of FIG. 1 is depicted as having various components, the environment 100 may have any number of additional or alternative components (e.g., any number of server devices, forecaster systems, client devices, or other components in communication with the digital joint-probability forecasting system 102 via the network 110). Accordingly, the digital joint-probability forecasting system 102 can analyze prediction data from any number of forecasting systems to provide ensemble predictions to a plurality of user devices and corresponding users. Furthermore, more than one component or entity in the environment 100 can implement the operations of the digital joint-probability forecasting system 102 described herein. To illustrate, the digital joint-probability forecasting system 102 can alternatively be implemented on the analyst device 108 and/or be part of another component or system.

According to one or more embodiments, the digital joint-probability forecasting system 102 can be implemented in another system, such as an analytics system 111. Specifically, the analytics system 111 can collect analytics data associated with various services, such as services provided to user(s) of the client device(s) 112. For example, the analytics system 111 can collect analytics data related to user interactions with digital content (e.g., number of clicks), conversions resulting from digital content, digital subscriptions, and/or other measurable data related to one or more events. Although FIG. 1 illustrates the digital joint-probability forecasting system 102 as part of the analytics system 111, the joint-probability forecasting system 102 can be part of another system, or part of a plurality of systems.

In one or more embodiments, the digital joint-probability forecasting system 102 performs operations associated with generating ensemble predictions based on predictions from a plurality of forecasters (e.g., forecaster systems 106a, 106b). The digital joint-probability forecasting system 102 obtains forecast data (e.g., predictions) from the forecaster systems 106a, 106b, analyzes past forecast data, and generates ensemble predictions of predictions for future events to provide to the analyst device 108 for a user 114 to view. For example, the digital joint-probability forecasting system 102 can communicate with the forecaster systems 106a, 106b to obtain predictions for a plurality of previous events (e.g., by receiving the predictions when the forecaster systems 106a, 106b create the predictions or at any time after) to use in generating ensemble predictions by combining predictions from the forecaster systems 106a, 106b for future events.

In one or more embodiments, the server device(s) 104 store and manage forecast data, error data, and information associated with generating ensemble predictions. Specifically, the server device(s) 104 can store and manage predictions for a plurality of events (e.g., previous events and future events) from the forecaster systems 106a, 106b to use in generating ensemble predictions to provide to the user 114 at the analyst device 108. For example, the server device(s) 104 can communicate with the forecaster systems 106a, 106b in connection with the plurality of events (e.g., at the time a prediction is made) over the network 110, which can include an Internet connection or other network connection.

To illustrate, an example of server device(s) 104 can include a database that stores, organizes, and maintains prediction data (e.g., in one or more tables) from the forecaster systems 106a, 106b.

In one or more embodiments, the server device(s) 104 provide ensemble predictions to the user 114 in response to a request by the analyst device 108 to create an ensemble prediction. In particular, the request can indicate a specific group of forecaster systems for creating the ensemble prediction. For example, the user 114 can select the forecaster systems 106a, 106b for generating an ensemble prediction based on predictions from the forecaster systems 106a, 106b at the analyst device 108. The analyst device 108 can then send the request to the digital joint-probability forecasting system 102 via the network 110.

In one or more embodiments, the digital joint-probability forecasting system 102 uses predictions associated with previous events and predictions associated with one or more future events to generate an ensemble prediction. The digital joint-probability forecasting system 102 can access predictions for previous events to determine error values for each of the predictions based on the difference between the predictions and the ground truth values for the corresponding previous events. The digital joint-probability forecasting system 102 can then generate one or more error probability density functions to represent the error values of the predictions within an error space. Based on the error probability density function(s) and predictions from the forecaster systems 106a, 106b for a future event, the digital joint-probability forecasting system 102 identifies a likelihood function and creates an ensemble prediction for a future event.

In one or more embodiments, the analyst device 108 includes a computing device that allows the user 114 to access and view prediction data from the digital joint-probability forecasting system 102. For example, the analyst device 108 can include a smartphone, tablet, desktop computer, laptop computer, or other device that is able to access the prediction data from the server device(s) 104 via the network 110 (e.g., any of the devices discussed below in reference to FIG. 12). The client device 110 can include one or more applications (e.g., analysis application 116) that allows the user 114 to view prediction data. For example, the client application 116 can include a software application running on the analyst device 108 (and/or hosted on the server device(s) 104) for viewing analytics data (e.g., historical performance data) and prediction data from the digital joint-probability forecasting system 102 and the forecaster systems 106a, 106b.

Additionally, the analyst device 108 can use the prediction data to perform one or more operations based on the type of prediction data. For example, based on the nature of the prediction data, the analyst device 108 can modify inventory levels, purchase or sell products (e.g., predict stock price and buy or sell stocks), initiate or modify digital content campaigns, generate/modify digital content, or perform other operations associated with content, products, or services. Similarly, the analyst device 108 can interact with the client device(s) 112 based on the prediction data. To illustrate, the analyst device 108 can obtain predictions regarding conversions that will result from a digital content campaign. The user 114 can then use the analyst device 108 to create or modify digital content associated with the digital content campaign and provide digital content to the client device(s) 112 based on the predictions. Accordingly, the user 114 can use the analyst device 108 to generate and/or provide digital content to the client device(s) 112 based on the prediction data.

Figure 2:
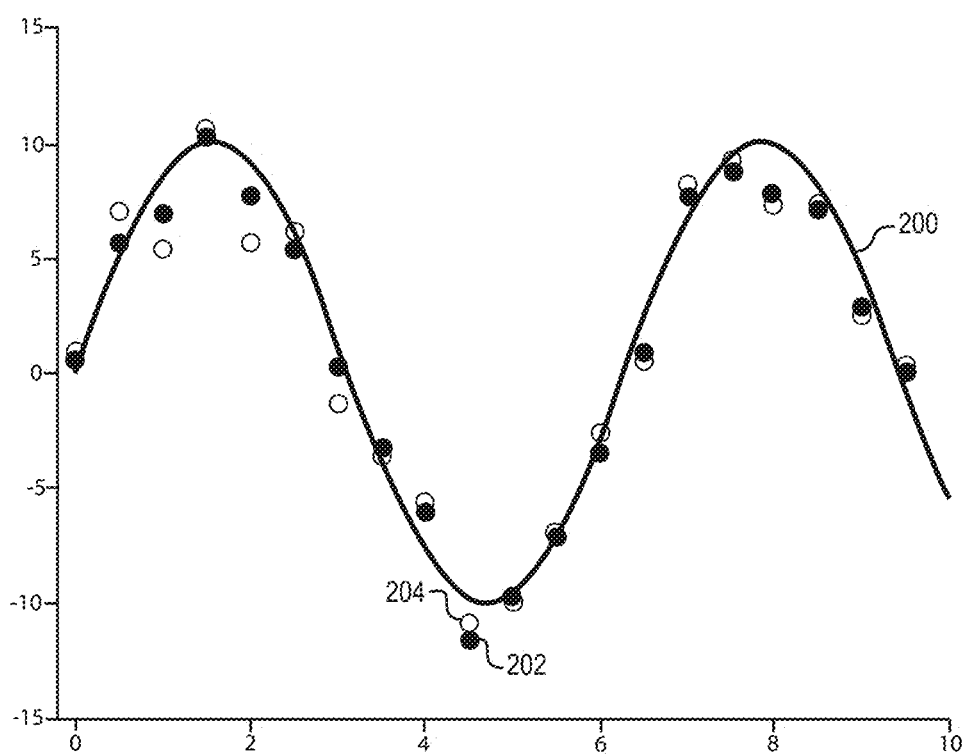
FIG. 2 illustrates a diagram of previous predictions for previous events from a plurality of forecasters in accordance with one or more embodiments.

As mentioned briefly above, the digital joint-probability forecasting system 102 can obtain predictions from a plurality of forecasters for a plurality of previous events. FIG. 2 illustrates a diagram of predictions for previous events from a plurality of forecasters. As illustrated, FIG. 2 includes a time-series function 200 of ground truth values for a plurality of previous events, as represented by the solid line. In particular, the ground truth values include data that the digital joint-probability forecasting system 102 collected for a plurality of events. For example, the plurality of events can include specific times (e.g., recurring times at regular intervals or non-regular intervals), dates, ranges of dates, events dependent on one or more other events occurring, or other events for which the plurality of forecasters create predictions. While the time-series function 200 of FIG. 2 includes example ground truth values in a sinusoidal function (i.e., $\sin(\tau(t))$ where $\tau(t)$ is a linear function that maps $t \in \mathbb{N}^*$ to an equally-spaced sequence of $\tau \in \mathbb{R}$), the ground truth values of various examples can follow any type of function including repeating or non-repeating functions.

When an event occurs, the digital joint-probability forecasting system 102 records and stores the ground truth value for the event. For instance, the digital joint-probability forecasting system 102 can measure or otherwise collect and store the ground truth values in a database, as described previously. Additionally, the digital joint-probability forecasting system 102 can store information associated with the ground truth values that allows the digital joint-probability forecasting system 102 to identify the times and/or other characteristics of the ground truth values. Thus, the digital joint-probability forecasting system can identify the time-series function 200 illustrated in FIG. 2 by collecting data for the plurality of events over time.

Additionally, FIG. 2 illustrates a plurality of predictions that generally follow the time-series function 200 of ground truth values. Specifically, the digital joint-probability forecasting system 102 can communicate with the plurality of forecasters to collect a plurality of predictions for the plurality of events. In one or more embodiments, the digital joint-probability forecasting system 102 obtains the predictions directly from the forecasters. Alternatively, the digital joint-probability forecasting system 102 can obtain the predictions via another entity, such as a prediction aggregator that aggregates the predictions from the forecasters.

As may be appreciated, forecasters can produce predictions with varied success based on the experience of the forecasters, forecasting models used, or other factors that influence the accuracy of the forecasters. For example, as illustrated, a first set of predictions (indicated by the unfilled circles, such as the unfilled circle 204) corresponds to a first forecaster and a second set of predictions (indicated by the filled circles, such as the filled circle 202) corresponds to a second forecaster. In the present embodiment, the second forecaster is a more skilled forecaster that generates predictions with greater accuracy than the first forecaster. Accordingly, the predictions in the second set are closer to the ground truth values on average than the predictions in the first set.

In one or more embodiments, one or more forecasters utilized by the digital joint-probability forecasting system 102 can have errors that are correlated. For example, for a case in which the first forecaster and second forecaster generate predictions with errors that are highly correlated, when the first forecaster generates predictions that overestimate the ground truth values, the second forecaster also tends to overestimate the ground truth values. Similarly, when the first forecaster generates predictions that underestimate the ground truth values, the second forecaster also tends to underestimate the ground truth values. Thus, the errors of predictions from the first forecaster and the second forecaster generally (though not necessarily always) follow the same pattern with respect to prediction errors relative to the ground truth values.

Additionally, while FIG. 2 illustrates predictions from two forecasters, the digital joint-probability forecasting system 102 can collect predictions for any number of identified forecasters. The number of forecasters from which the digital joint-probability forecasting system 102 obtains predictions can depend on the subject of the forecasts involved, the number of forecasters available, a request for an ensemble prediction from a user (e.g., a request to create the ensemble prediction based on a specific group or number of forecasters), or other reasons as may be determined for a particular embodiment. Accordingly, the digital joint-probability forecasting system 102 collects prediction data from each of the identified forecasters and the corresponding ground truth values for the previous events.

Furthermore, after collecting the prediction data and ground truth values for previous events, the digital joint-probability forecasting system 102 determines error values for each of the predictions from each of the forecasters. In particular, the digital joint-probability forecasting system 102 determines an error value for a prediction for an event by determining the difference between the prediction and the ground truth value for the event. For instance, if the ground truth value is "5" on a numerical scale and the prediction is "4" then the prediction has an error value of "−1," indicating that the prediction fell below (i.e., underestimated) the ground truth value on a numerical scale. Alternatively, if the prediction for the ground truth value above is "5.5" then the prediction has an error value of "0.5," indicating that the prediction was above (i.e., overestimated) the ground truth value.

Figure 3:
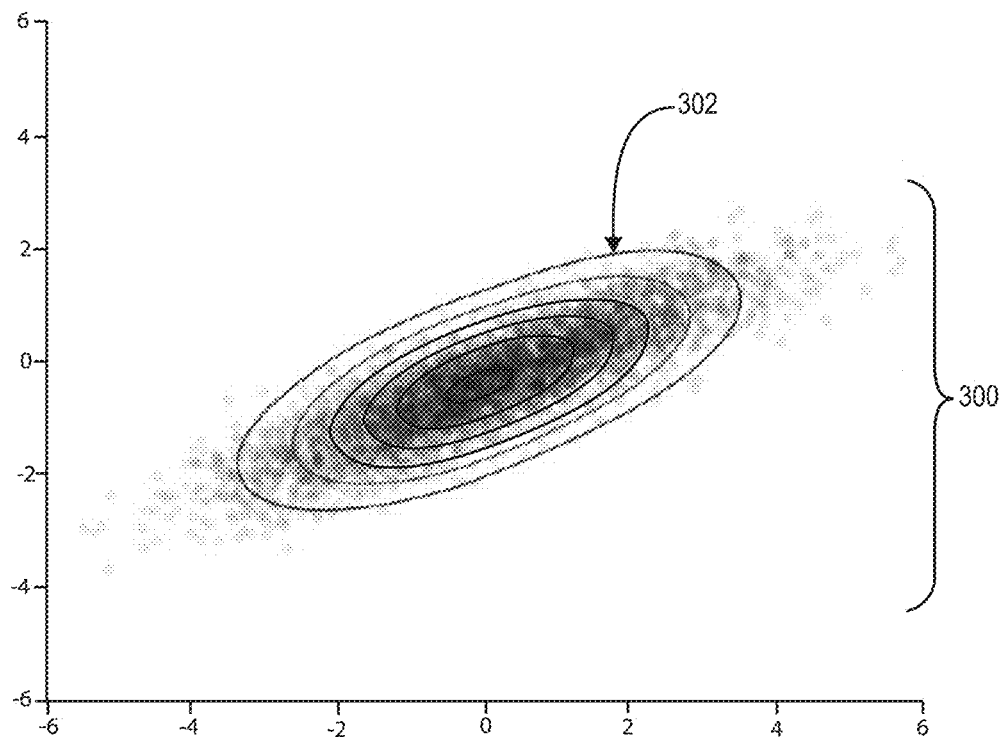
FIG. 3 illustrates a diagram of a probability density function for error values associated with previous predictions for previous events in accordance with one or more embodiments.

After determining the error values for the predictions for each forecaster and for the plurality of events, the digital joint-probability forecasting system 102 maps the error values to an error space. For example, FIG. 3 illustrates a graph illustrating a mapping of error values to an error space. As illustrated, the digital joint-probability forecasting system 102 maps the error values to an error space that includes a number of dimensions that matches a total number of forecasters. Specifically, when mapping the error values to the error space, the digital joint-probability forecasting system 102 maps all of the error values corresponding to a single event (i.e., all of the error values for predictions from every forecaster for the event) to a single point within the error space. Thus, a point within the error space represents all of the predictions for the corresponding event, resulting in an N-dimensional point of an N-dimensional error space, where N corresponds to the number of predictions (and forecasters) for the event. FIG. 3 illustrates a plurality of two-dimensional points 300 within a two-dimensional error space.

In one example for a two-dimensional point for a first event, as in FIG. 3, the digital joint-probability forecasting system 102 obtains a first error value for a first prediction from a first forecaster for an event and a second error value for a second prediction from a second forecaster for the event. The digital joint-probability forecasting system 102 can then plot the error values for the event within a two-dimensional error space by using the first error value and the second error value as the coordinates within the error space. For instance, if the first error value for the event is "−1" and the second error value for the event is "−1.25," the digital joint-probability forecasting system 102 plots a combined error value point at coordinates (−1, −1.25) within the error space.

Similarly, when plotting the error values for a second event, the digital joint-probability forecasting system 102 plots a first error value of "1" and a second error value of "2" corresponding to the predictions from the first forecaster and the second forecaster, respectively, at the corresponding location in the error space. To illustrate, the digital joint-probability forecasting system 102 plots the combined error value point at (1, 2) within the error space so that the combined error value points include the error value corresponding the first forecaster first followed by the error value corresponding to the second forecaster. Thus, the digital joint-probability forecasting system 102 plots combined sets of error values at a plurality of points corresponding to respective error values within the error space for each event.

Once the digital joint-probability forecasting system 102 has plotted the combined error value points for the previous events (e.g., by plotting all of the error values or a threshold number of the error values), the digital joint-probability forecasting system 102 determines a distribution of the error values (i.e., a probability distribution function for the error value). In particular, in one or more embodiments, the digital joint-probability forecasting system 102 applies a kernel density estimation to the error space to summarize the combined error value points within the error space. Specifically, the digital joint-probability forecasting system 102 applies the kernel density estimation to the error values to generate an error probability density function 302 for the error space. As mentioned, the error probability density function 302 represents a distribution of the density of the error values within the error space.

Figure 4:
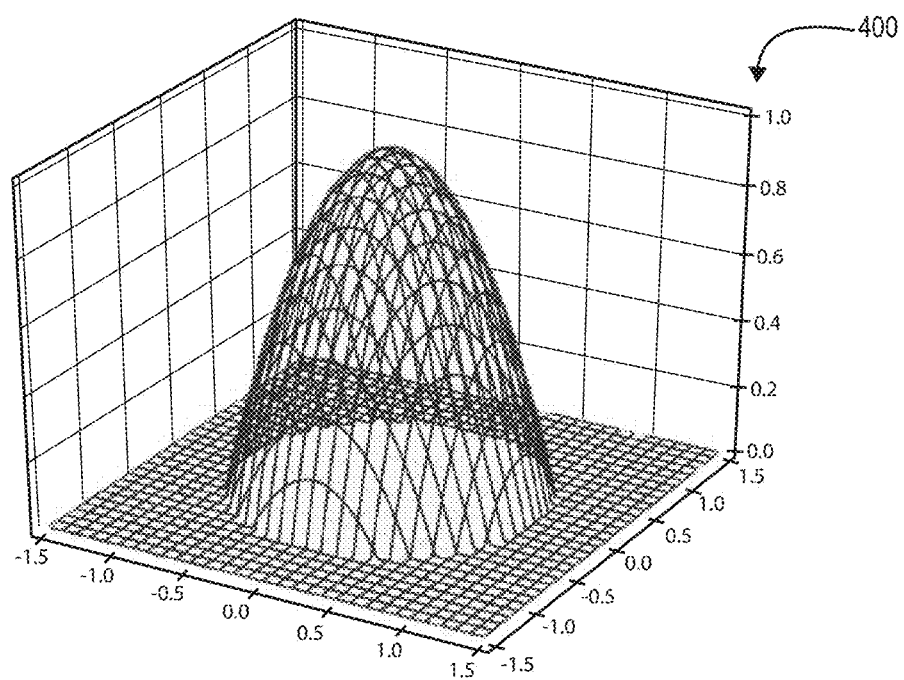
FIG. 4 illustrates a diagram of a kernel density estimation in accordance with one or more embodiments.

The digital joint-probability forecasting system 102 can select a kernel from a plurality of different kernels. For example, the digital joint-probability forecasting system can select from kernels including, but not limited to, uniform, triangle, Epanechnikov, quartic (biweight), tricube, triweight, Gaussian, quadratic, and cosine kernels. To illustrate, the digital joint-probability forecasting system 102 can use an Epanechnikov kernel to apply a kernel density estimation to the error values in the error space of FIG. 3 to obtain the error probability density function. As illustrated, because the mapping of error values to the error space includes a two-dimensional mapping, the digital joint-probability forecasting system 102 uses a two-dimensional Epanechnikov kernel 400, shown in FIG. 4, to generate a joint error probability density function 302 (i.e., a two-dimensional joint probability density function). Accordingly, the resulting error probability density function is overlaid on top of the plotted points in FIG. 3.

In one or more embodiments, applying a kernel density estimation to the error space involves using a selected kernel (e.g., the Epanechnikov kernel 400) to smooth data from the error space to estimate an error probability density function. Specifically, kernel density estimation uses inferences about the population (i.e., the error values) in the error space to smooth the data and convert a plurality of discrete data points to a continuous function. For example, the kernel density estimation identifies a window within the error space for error values and then determines a value that represents the density of the error values within the window. The digital joint-probability forecasting system 102 repeats this process for a plurality of windows within the error space and combines the results for the plurality of windows to generate a smooth error probability density function from the error space according to the selected kernel.

Because the joint error probability density function 302 is three-dimensional, it is portrayed on the two-dimensional space of FIG. 3 as a series of contour lines. Specifically, as shown in FIG. 3, the error probability density function 302 includes a plurality of contour lines that represent the density of the combined error value points in the error map. Specifically, the contour lines illustrate that the density of the combined error value points increases toward the center of the contour lines, and decreases away from the center of the contour lines. For example, the most dense portion of the error space is located in the center of the contour lines, indicating the numerical values of the greatest number of combined error value points.

As just shown, in one or more embodiments, the digital joint-probability forecasting system 102 generates an error probability density function from a multi-dimensional error space. In particular, the digital joint-probability forecasting system 102 can map error values to an N-dimensional error space from a plurality of forecasters to create an N-dimensional error probability density function. However, as the number of dimensionalities for an error space increase, the number of values needed to accurately define the error probability density function also increase. The digital joint-probability forecasting system 102 can analyze the number of error values and determine whether sufficient data exists to utilize a particular multi-dimensional error space.

For example, the digital joint-probability forecasting system 102 can determine that the forecasters have produced an adequate forecast history (e.g., history of predictions with corresponding error values) to allow the digital joint-probability forecasting system 102 to generate an error probability density function with a specific amount of accuracy. To illustrate, the digital joint-probability forecasting system 102 can determine the forecast history is adequate for creating an error probability density function based on a ratio or threshold number of collected error values for previous events relative to the number of forecasters. A greater number of error values relative to the number of forecasters can increase the accuracy of the resulting error probability density function.

In the embodiment of FIG. 3, the digital joint-probability forecasting system 102 generates a joint error probability density function $p(\in_1, \in_2)$ in which $\in_1, \in_2$ represents the error values associated with a first forecaster and a second forecaster, respectively. Specifically, the digital joint-probability forecasting system 102 generates a joint error probability density function based on a two-dimensional error space. To generalize the process for N dimensions, the digital joint-probability forecasting system determines error values for N forecasters for K previous events to obtain a total of K points in an N-dimensional space. The digital joint-probability forecasting system 102 then generates the error probability density function for the error values as $p(\in_1, \in_2, \ldots, \in_N)$, where $\in_1, \in_2, \ldots, \in_N$ represents the error values associated with N forecasters.

Alternatively, the digital joint-probability forecasting system 102 can determine that the forecast history is not adequate for creating an error probability density function from a multi-dimensional error space. Specifically, the digital joint-probability forecasting system 102 can determine that the forecast history does not include a large enough number of collected error values for mapping to a multi-dimensional space and creating an accurate joint error probability density function. For instance, the digital joint-probability forecasting system 102 can use a threshold number of error values and other factors to determine whether to create a multi-dimensional error probability density function.

In one or more embodiments, in response to determining that the forecast history does not include a large enough number of error values, the digital joint-probability forecasting system 102 generates a plurality of error probability density functions from a one-dimensional error space. To illustrate, the digital joint-probability forecasting system 102 can map error values from each forecaster to a one-dimensional error space. The digital joint-probability forecasting system 102 can then apply a one-dimensional kernel to the error values of a forecaster within the one-dimensional error space to produce a single-variable error probability density function. The digital joint-probability forecasting system 102 can repeat this process for each of the forecasters to produce a plurality of error probability density functions— one for each of the forecasters. Moreover, in one or more embodiments, the digital joint-probability forecasting system 102 can combine the individual error probability density functions (e.g., by taking their product) to generate a combined error probability density function.

As discussed above, after determining one or more error probability density function(s), the digital joint-probability forecasting system 102 can generate an ensemble prediction for a future event. In particular, the digital joint-probability forecasting system 102 can receive a plurality of predictions for the future event from the plurality of forecasters. For example, each of the forecasters can generate a prediction for the future event using their respective forecasting methods. As with the predictions for the previous events, each of the predictions for the future event can have an error based on the ground truth value for the future event. Because the future event has not occurred, the ground truth value is not yet realized. Accordingly, the digital joint-probability forecasting system 102 generates an ensemble prediction that estimates the ground truth value using the predictions for the future event and the error probability density function(s) for the error space.

In one or more embodiments, the digital joint-probability forecasting system 102 estimates the ground truth value for the future event by generating a likelihood function for the ground truth event. Specifically, the digital joint-probability forecasting system 102 uses the error probability density function(s) to determine a likelihood function that describes probabilities of a plurality of possible values being the ground truth value for the future event. For example, the digital joint-probability forecasting system 102 obtains a plurality of predictions for the future event from the plurality of forecasters. To illustrate, in the previously described case involving two forecasters, the digital joint-probability forecasting system 102 obtains two predictions for the future event—a first prediction from the first forecaster and a second prediction from the second forecaster. As with the predictions for the previous events, the predictions for the future event include a numerical value prediction of the ground truth value of an event that has not yet occurred.

Figure 5:
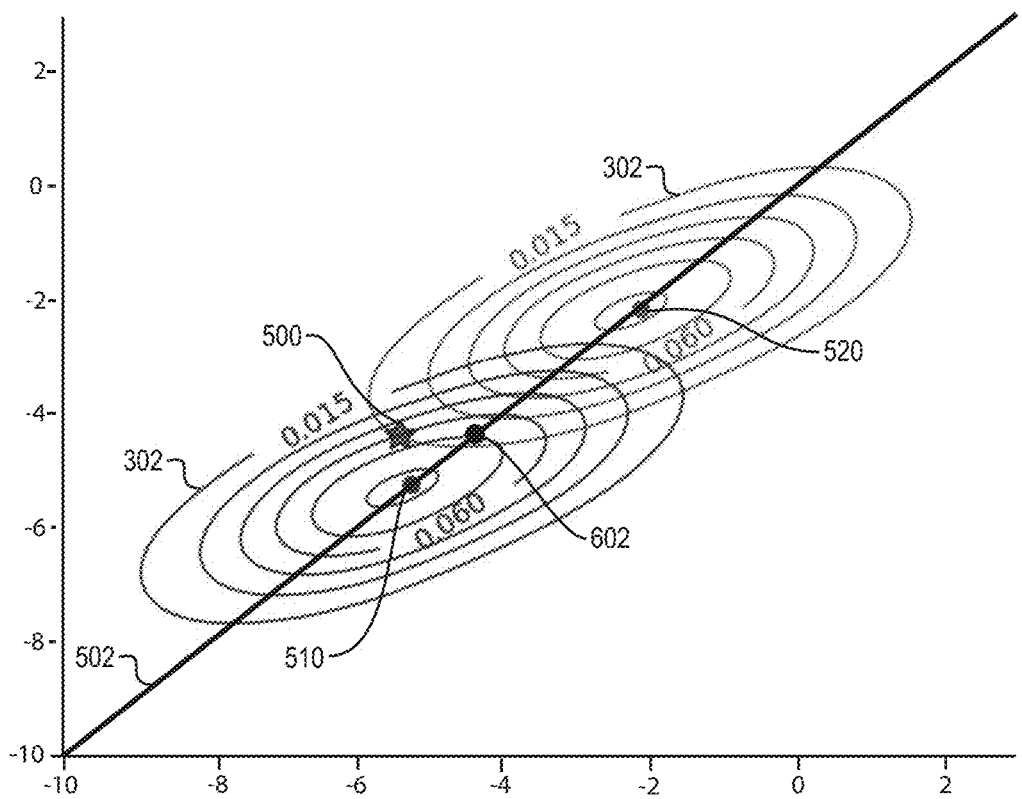
FIG. 5 illustrates a diagram of an error probability density function applied to predictions for future events from a plurality of forecasters in accordance with one or more embodiments.

After obtaining the predictions of the future event from the forecasters, the digital joint-probability forecasting system 102 determines the likelihood function given the predictions of the future event. FIG. 5 illustrates one example of applying an error probability density function to the predictions of the future event. In particular, FIG. 5 illustrates that the digital joint-probability forecasting system 102 applies the two-dimensional error probability density function 302 of FIG. 3 to a combined prediction 500 for the predictions of the future event from the first forecaster and the second forecaster. The digital joint-probability forecasting system 102 combines the two predictions to plot the prediction in a two-dimensional space. For example, if the first prediction has a value of "−5.16" and the second prediction has a value of "−4.16," the combined prediction 500 has a coordinate of (−5.16, −4.16).

The digital joint-probability forecasting system 102 can then apply the error probability density function 302 to the combined prediction 500 to determine the likelihood function. In particular, the digital joint-probability forecasting system 102 can take the combined prediction 500, assume a variety of possible values for the ground truth, and then determine the likelihood of generating the combined prediction 500 for the variety of possible values given the error probability density function. This approach differs significantly from many conventional systems (which calculate a single ground truth value by applying weights to different predicted values). Indeed, the digital joint-probability forecasting system 102 takes the predicted values as given, and then, utilizing the predicted values and the error probability density function, generates a likelihood function that reflects a variety of different possible values for the ground truth.

There are a variety of different ways to conceptualize this approach. For example, FIG. 5 illustrates generating the likelihood function by moving the error probability density function along a line of unit slope 502 representing possible values for the ground truth. As illustrated in FIG. 5, evaluating the error probability density function 302 along the line of unit slope 502 causes the center of the error probability density function 302 to be centered at different possible values for the ground truth along the line of unit slope 502. For example, FIG. 5 illustrates an example of evaluating the error probability density function 302 for the combined prediction 500 at (−5.16, −4.16) with the error probability density function 302 centered on the coordinate 510 at (−5, −5). The digital joint-probability forecasting system 102 centers the error probability density function 302 at the coordinate 510 and determines the value of the error probability density function 302 where it intersects the combined prediction 500 (e.g., a value of 0.06). The value of the error probability density function 302 where it intersects the combined prediction 500 is then recorded together with the possible value for the ground truth. Thus, for example, the digital joint-probability forecasting system 102 can record −5 (i.e., the possible value of the ground truth) and 0.06 (i.e., the value where the error probability density function 302 intersects the combined prediction 500 when centered on the possible value for the ground truth). The resulting coordinate (−5, 0.06) is one point of a likelihood function for the future event.

As shown in FIG. 5, the digital joint-probability forecasting system 102 can repeat this process of identifying a value of the error probability density function 302 as the error probability density function is moved along the line of unit slope 502. For example, as shown, the digital joint-probability forecasting system 102 also centers the error probability density function 302 at the coordinate 520 at (−2, −2). The digital joint-probability forecasting system 102 then determines a value of the error probability density function 302 where it intersects the combined prediction 500 (e.g., 0.015). The digital joint-probability forecasting system 102 can then record the value of the possible value for the ground truth (i.e., −2) together with the function value where the error probability density function 302 intersects the combined prediction 500 (i.e., 0.015). The resulting coordinate (−2, 0.015) provides another point of a likelihood function for the future event.

Figure 6:
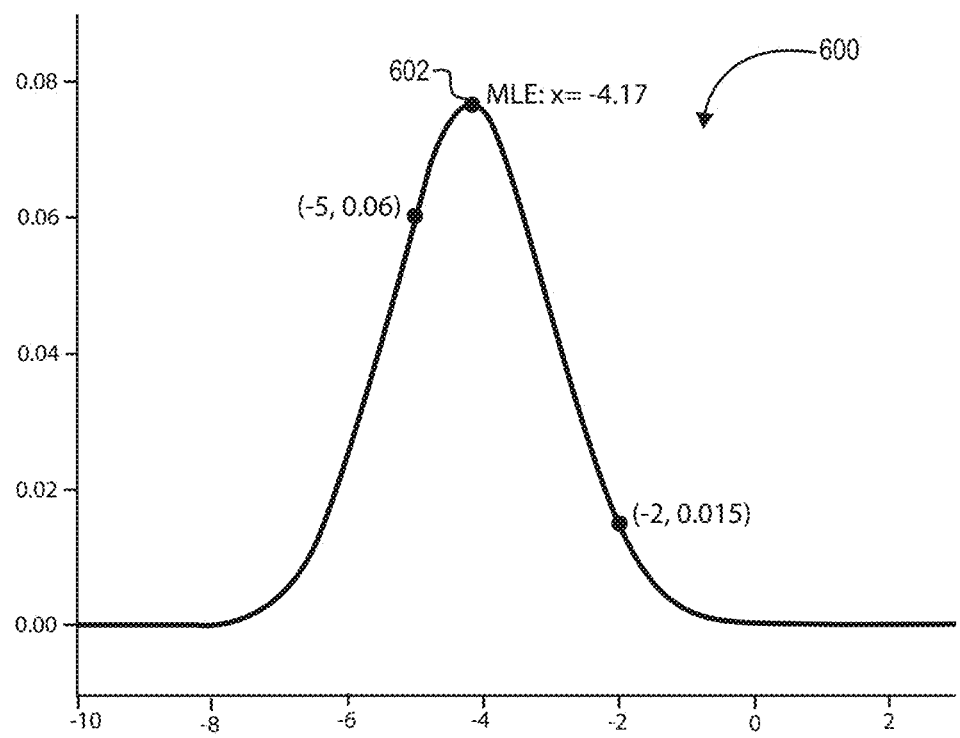
FIG. 6 illustrates a diagram of a likelihood function based on an error probability density function in accordance with one or more embodiments.

The digital joint-probability forecasting system 102 can thus generate a full likelihood function that indicates the likelihood for a plurality of possible values by evaluating the error probability density function centered along a plurality of points of the line of unit slope. FIG. 6 illustrates the full likelihood function 600 resulting from evaluating the error probability density function (e.g., the error probability density function 302 of FIG. 3) at the combined prediction 500 at (−5.16, −4.16) for a plurality of possible values along the line of unit slope 502. As illustrated, the likelihood function 600 is represented by a bell-shaped curve and illustrates the probabilities of the possible values being the ground truth value for the future event. Specifically, FIG. 6 illustrates the possible values and a corresponding probability for each possible value. For example, as discussed in relation to FIG. 5, the probability density of "−5" being the ground truth value is "0.06," and the probability density of "−2" being the ground truth value is "0.015."

After determining the likelihood function 600 for the ground truth of the future event from the error probability density function, the digital joint-probability forecasting system 102 generates a prediction for the future event. In one or more embodiments, the digital joint-probability forecasting system 102 calculates the highest point of the likelihood function, which represents the possible value with the highest probability density to be the ground truth value of the future event. For example, in FIG. 6, the digital joint-probability forecasting system 102 uses a maximum likelihood estimation algorithm to determine the point on which the likelihood function 600 has a highest probability value (e.g., the maximum point 602 in FIGS. 5 and 6), which in the present example is at a value of "−4.17." Accordingly, the digital joint-probability forecasting system 102 generates a prediction for the future event to be "−4.17."

Note that the shape of the probability density function 302 for the error values corresponding to the forecasters on which the ensemble prediction is based determines the value of the ensemble prediction. Indeed, the likelihood function 600 can be viewed as a mirrored profile of the probability density function 302 if cut along a line of unit slope that intersects the combined prediction 500. Thus, the shape of the probability density function 302 ultimately leads to the prediction for the future event. For example, if a two-dimensional error probability density function is an isotropic Gaussian, the point on the line of unit slope $x_1 = x_2$ that takes the maximum likelihood on the combined prediction 500 is also the closest point to point 500, that is, $$\left( \frac{x_1^* + x_2^*}{2}, \frac{x_1^* + x_2^*}{2} \right).$$

Alternatively, if the probability density function is not isotropic, the maximum likelihood estimation may not be the value on the line of the unit slope closest to the combined prediction. For instance, for the probability density function 302 of FIG. 3, the maximum likelihood estimation has a value of "−4.17," as indicated by the maximum point 602 in the likelihood function 600 of FIG. 6. As previously mentioned, the error values of the predictions for the first forecaster and the second forecasters are highly correlated, while the second forecaster is more skilled than the first forecaster. The shape and structure of the error probability density function reflects the skill of the forecasters, which causes the ensemble prediction to be closer to the prediction from the second forecaster for the future event. In addition, the digital joint-probability forecasting system prevents the first forecaster from degrading the ensemble prediction.

Describing the foregoing process in more generic terms, when generalizing the process to the case with N forecasters, the digital joint-probability forecasting system 102 determines an N-dimensional error probability density function $p(\in_1, \in_2, \ldots, \in_N)$, which in turn determines the likelihood function of the ground truth value of the future event from the predictions of the N forecasters. In particular, the likelihood function is defined as $l(s) = l(x^*_1, x^*_2, \ldots, x^*_N; s) = p(x^*_1 - s, x^*_2 - s, \ldots, x^*_N - s)$, where s is the unknown ground truth value for the future event and $(x^*_1, x^*_2, \ldots, x^*_N)$ are the (known) predictions from the forecasters for the future event. The equation above for the likelihood function can also be interpreted as the sampling of the error probability density function $p(\in_1, \in_2, \ldots, \in_N)$ along the line of unit slope that passes through $(x^*_1, x^*_2, \ldots, x^*_N)$ in the N-dimensional space, namely, $\{x_k = x^*_k - s, k \in \mathbb{N}^*_{\leq N}, s \in \mathbb{R}\}$.

Additionally, denoting $l(s)$ as the likelihood function, the digital joint-probability forecasting system 102 can find the maximum likelihood estimation of the ground truth value as the root of $l'(s)$, which the digital joint-probability forecasting system 102 can assign as the value of the point ensemble prediction for the future event.

As previously mentioned, the digital joint-probability forecasting system 102 can use prediction data associated with a large number of forecasters (i.e., large N) to generate an ensemble prediction. As the number of forecasters increases, generating an accurate prediction uses a greater amount of prediction data when using probability density functions in a multi-dimensional error space. For example, generating an accurate joint probability density function for ten forecasters generally necessitates more data (i.e., more error values) than generating an accurate joint probability density function for two or three forecasters. If the amount of error data is insufficient to generate an accurate joint probability density function for a multi-dimensional error space, the digital joint-probability forecasting system 102 can generate a plurality of probability density functions in a one-dimensional error space for the plurality of forecasters. Specifically, each probability density function would represent the error value distribution corresponding to a single forecaster.

Figure 7A:
FIGS. 7A-7D illustrate generating a combined likelihood function from a plurality of individual likelihood functions corresponding to a plurality of forecasters in accordance with one or more embodiments.
Figure 7B:
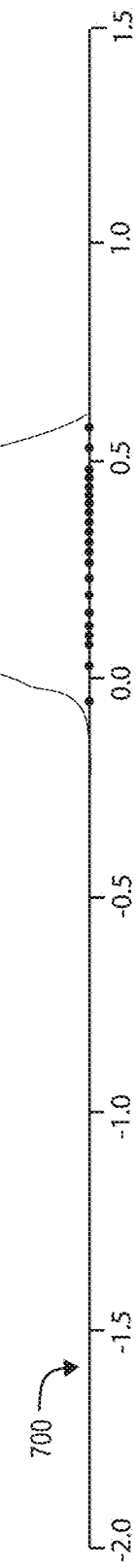

For example, FIGS. 7A, 7B illustrate mapping error values to a one-dimensional error space and generating a probability density function. In particular, FIG. 7A illustrates a one-dimensional error space 700. The digital joint-probability forecasting system 102 identifies a plurality of error values 702a-702n for a first forecaster for a plurality of events (e.g., an error of −0.01 for a first event, an error of 0.02 for a second event, error of 0.03 for a third event). As shown, the digital joint-probability forecasting system 102 maps the plurality of error values 702a-702n to the one-dimensional error space 700.

Moreover, as illustrated in FIG. 7B, the digital joint-probability forecasting system 102 generates a probability distribution function 704 for the first forecaster from the error values 702a-702n in the one-dimensional error space 700. In particular, the digital joint-probability forecasting system 102 applies a kernel density estimation to the error values 702a-702n in the error space 700 to generate the probability density function 704. The probability density function 704 thus reflects the probability of various error values for the first forecaster.

The digital joint-probability forecasting system 102 can also transform the probability density function 704 into a likelihood function. For example, upon receiving a prediction for a future event from the first forecaster, the digital joint-probability forecasting system 102 can generate a likelihood function for the future event based on the probability density function. Specifically, as shown in FIG. 7C, the digital joint-probability forecasting system 102 can generate a likelihood function 710 by moving the probability density function 704 to the prediction for the future event and mirroring (e.g., flipping) the probability density function 704 around a vertical axis.

Figure 7C:
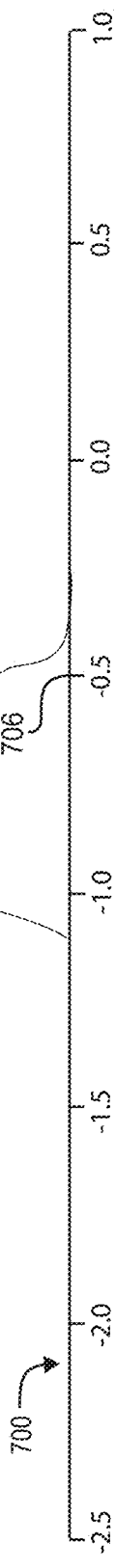

To illustrate, in relation to FIG. 7C, the digital joint-probability forecasting system 102 identifies a prediction 706 of "−0.5" from the forecaster for the future event. Accordingly, the digital joint-probability forecasting system 102 moves the probability distribution function 704 down by 0.5 and creates a mirror image around a vertical axis (i.e., a vertical axis through −0.5). The result is the likelihood function 710, which reflects the probability of a plurality of possible values being the ground truth given the prediction of the first forecaster for the future event.

In one or more embodiments, the digital joint-probability forecasting system 102 combines the likelihood function 710 to generate a likelihood function for a plurality of forecasters. For example, the digital joint-probability forecasting system 102 can repeat the process described in relation to FIGS. 7A-7C to generate a plurality of probability distribution functions and/or likelihood functions for each forecaster. The digital joint-probability forecasting system 102 can then combine the likelihood functions (e.g., by taking the product of all or a set of likelihood functions).

Figure 7D:
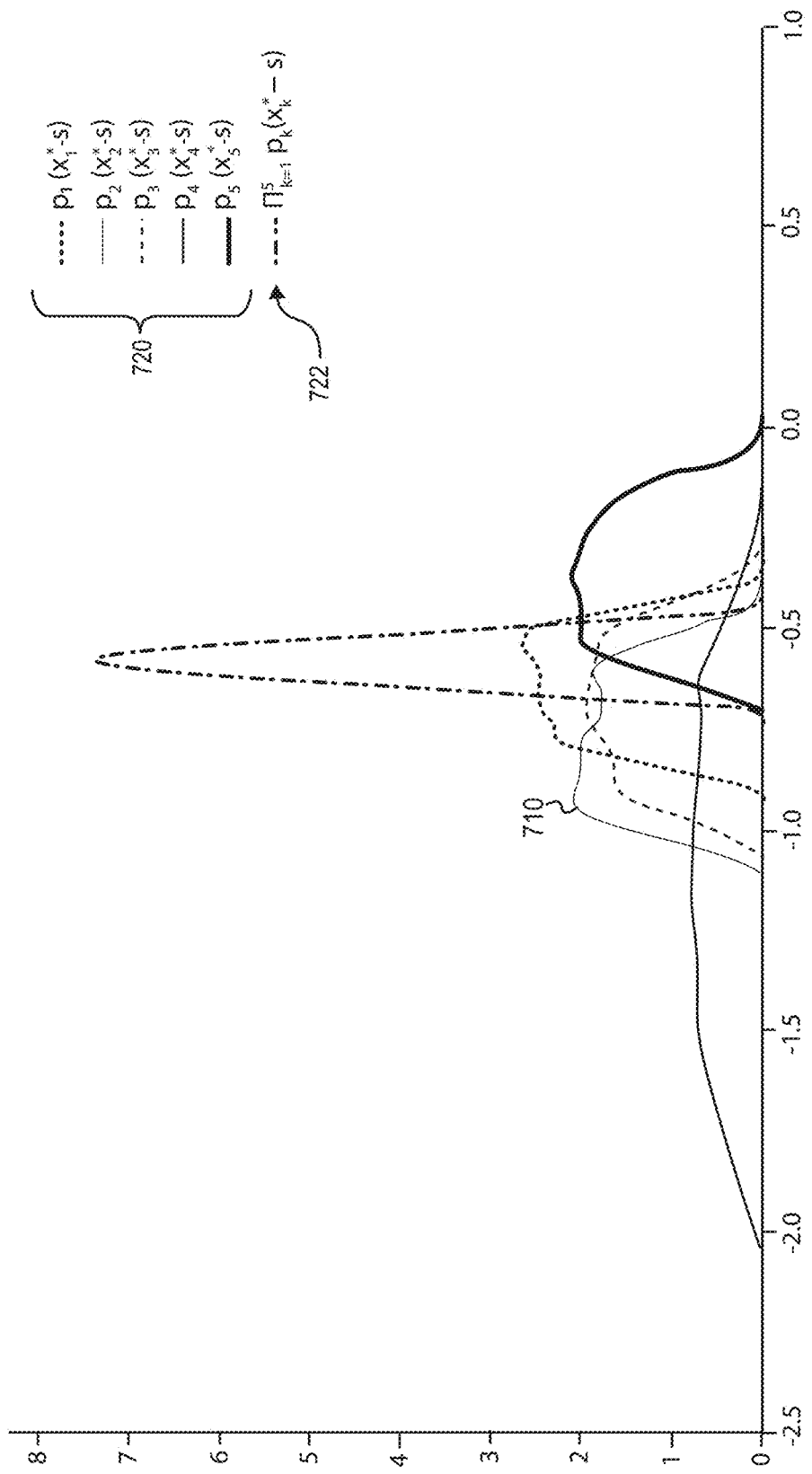

Indeed, FIG. 7D illustrates a plurality of single-variable likelihood functions 720 (including the likelihood function 710). Moreover, FIG. 7D illustrates a combined likelihood function 722 that is the product of the likelihood functions 720. Furthermore, the combined likelihood function 722 of FIG. 7 has been normalized (such that the integral of function 722 equals to 1).

To describe this approach in more general terms, in one or more embodiments, to generalize the process of creating ensemble predictions based on probability density functions representing prediction error values for a large number of forecasters and/or in the absence of a sufficient amount of prediction data for a multi-dimensional error space, the digital joint-probability forecasting system 102 assumes the error values are independent to each other. When all error values of the predictions for the future event are independent to each other, the probability density function takes the form $p(\in_1, \in_2, \ldots, \in_N) = \Pi_{k=1}^{N} p_k(\in_k)$, where $p_k(\in_k)$ represents the single-variable probability density function for the kth forecaster's error values. Thus, the digital joint-probability forecasting system 102 can determine the joint probability density function for the N-dimensional space as the product of a plurality of probability density functions corresponding to the plurality of forecasters based on the assumption that the error values are independent. Accordingly, the digital joint-probability forecasting system 102 can generate an ensemble prediction for a large number of forecasters even without first obtaining sufficient prediction data to create a probability density function from a high-dimensional error space.

In one or more embodiments, after determining a plurality of probability density functions from a one-dimensional error space, the digital joint-probability forecasting system can generate a likelihood function based on the plurality of probability density functions. For example, the digital joint-probability forecasting system 102 can generate a plurality of single-variable likelihood functions for the plurality of forecasters. Additionally, the digital joint-probability forecasting system 102 can generate a combined likelihood function that represents the probabilities of possible values being a ground truth value for the plurality of forecasters.

As illustrated, each single-variable likelihood function in 720 (the variable being s) represents the probabilities associated with possible values being the ground truth value for the future event for a given forecaster. In particular, each single-variable likelihood function 720 is centered at the corresponding forecaster's point forecast $x^*_k$ such that the likelihood functions 720 for the ground truth value for the future event are $p_k(x^*_k - s)$, $k=1, 2, \ldots, 5$. The width of the distribution measures the past performance of the corresponding forecaster. By combining the likelihood density functions 720 (i.e., by obtaining $\Pi_{k=1}^{5} p_k(x^*_k - s)$, the product of the likelihood functions 720), the digital joint-probability forecasting system 102 can create a combined likelihood function 722 that is representative of all of the forecasters. In particular, the combined likelihood function 722 represents the probabilities of a plurality of possible values being the ground truth value for the future event.

In one or more alternative embodiments, the digital joint-probability forecasting system 102 generates a plurality of probability density functions and combines the probability density functions to create a joint probability density function representative of the error values of all of the forecasters. Specifically, the digital joint-probability forecasting system 102 can generate the joint probability density function by determining a product of a plurality of individual forecaster probability density functions. Furthermore, the digital joint-probability forecasting system 102 can then obtain the likelihood function from the joint probability density function.

Figure 8A:
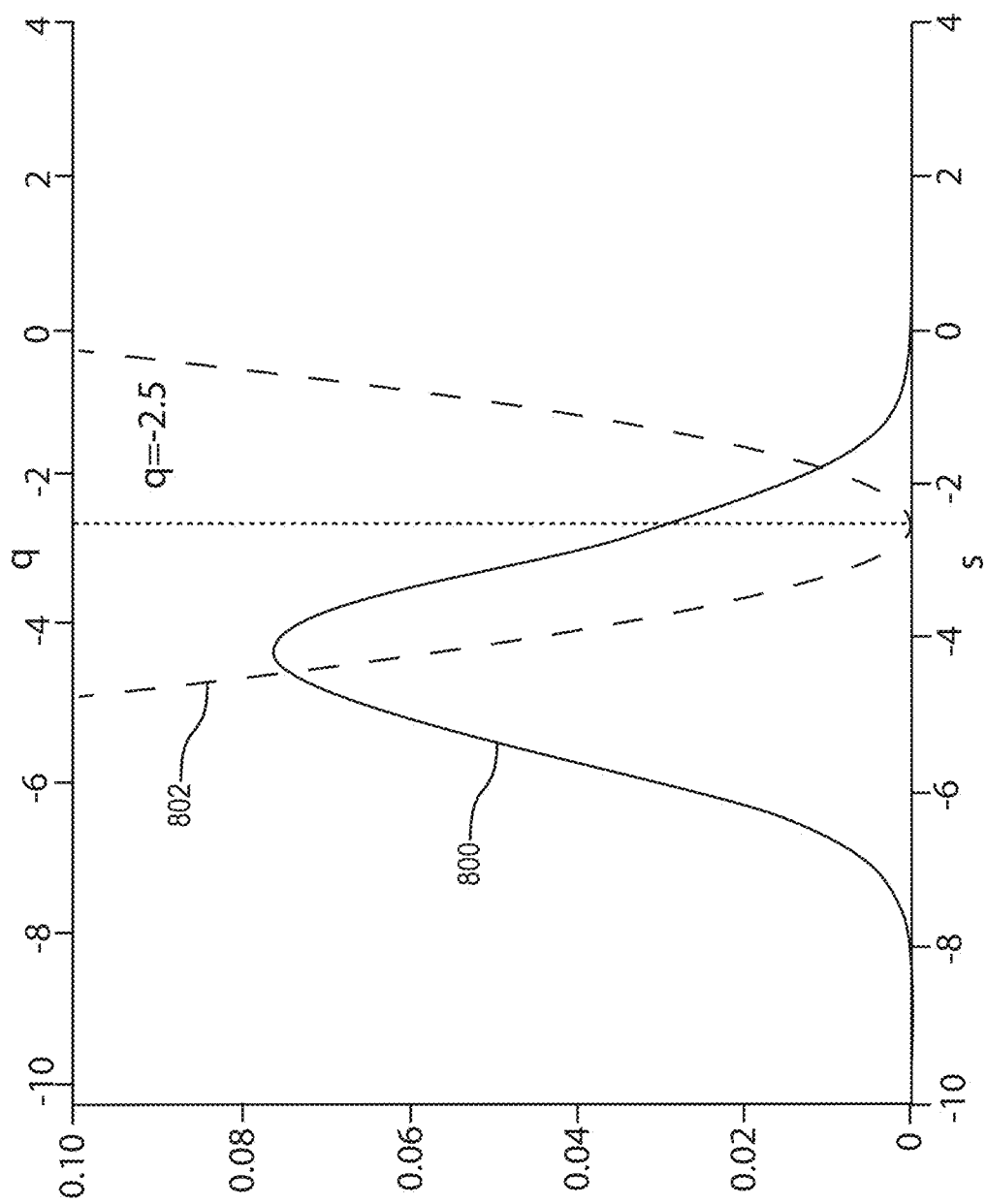
FIGS. 8A-8C illustrate diagrams of applying a loss function to a likelihood function in accordance with one or more embodiments.
Figure 8B:
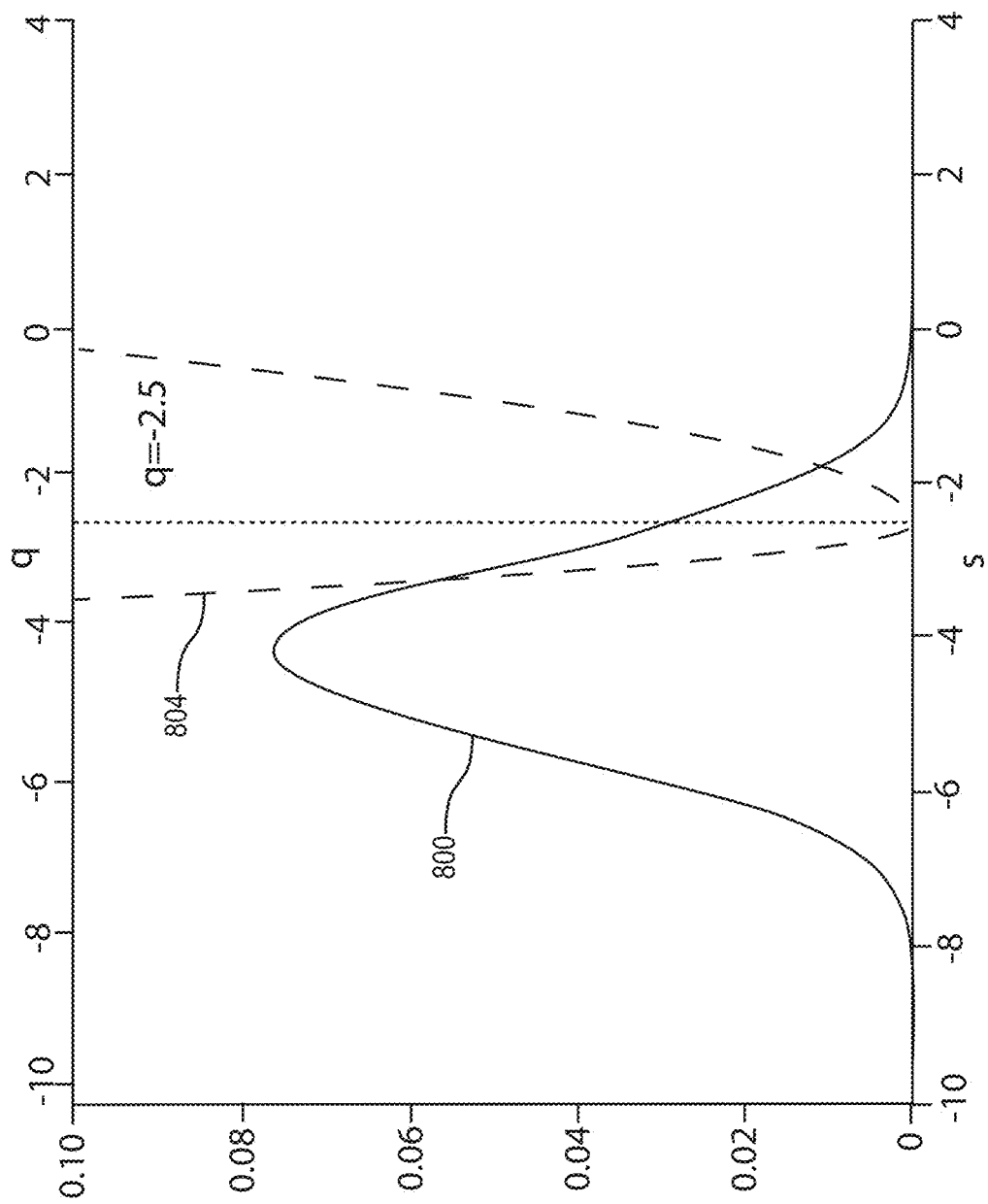
Figure 8C:
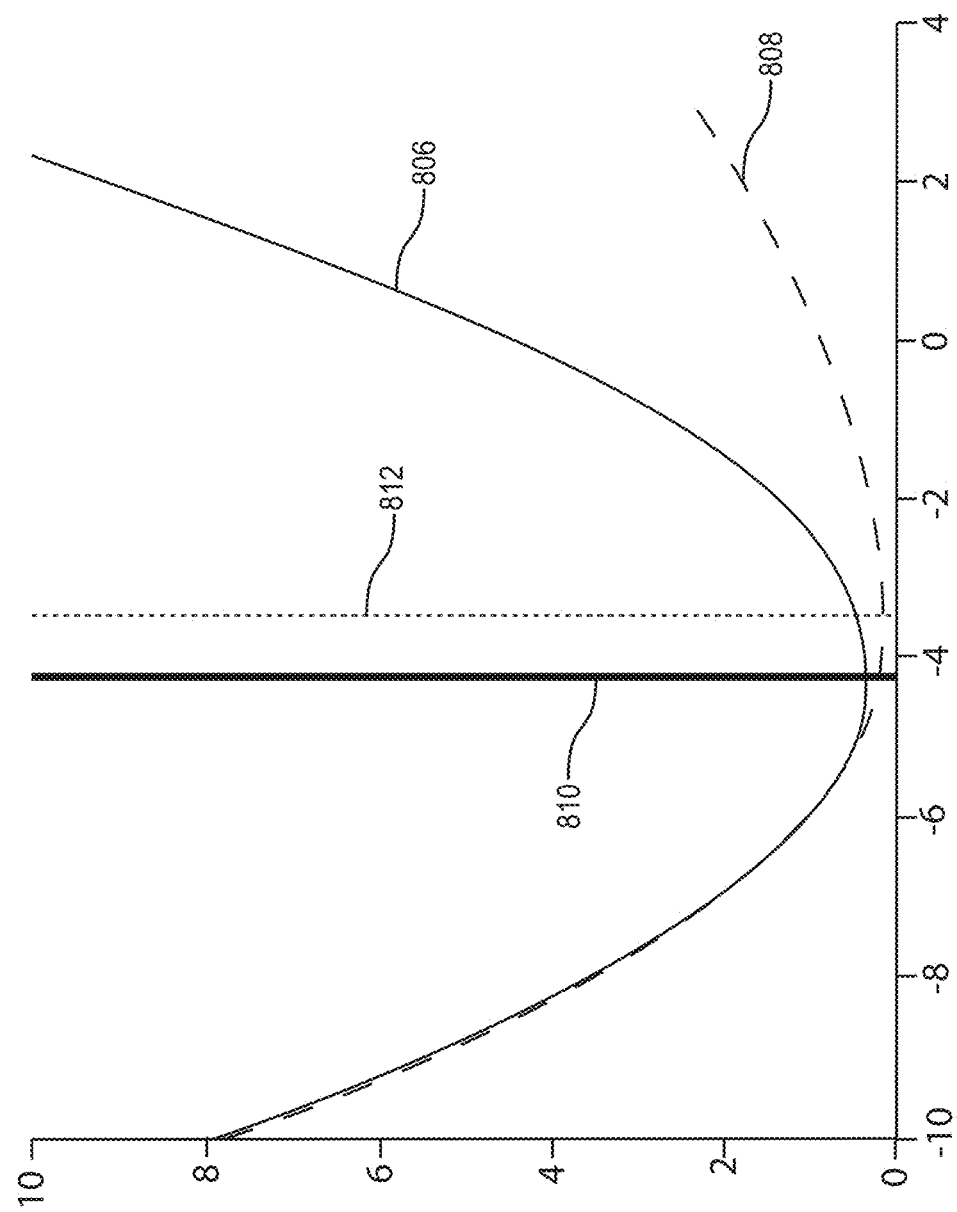

As described above, once the digital joint-probability forecasting system 102 has a likelihood function, the digital joint-probability forecasting system 102 can generate an ensemble prediction using a maximum likelihood estimation of the likelihood function. Alternatively, the digital joint-probability forecasting system 102 can use other methods and/or a combination of additional methods to generate the ensemble prediction from the likelihood function. For instance, the digital joint-probability forecasting system 102 can identify a loss function based on the subjective or objective cost of making imprecise forecast(s). To illustrate, FIGS. 8A-8C illustrate various embodiments of applying one or more loss function to a likelihood function to determine an ensemble prediction. The digital joint-probability forecasting system 102 uses the one or more loss functions to minimize the determined cost associated with a strategic business model or other model for minimizing a risk associated with overestimating or underestimating a ground truth value for a future event.

For example, FIG. 8A illustrates a graph that includes a likelihood function 800, as previously described, and a loss function 802. As mentioned, the loss function 802 represents a model of cost resulting from errors in a prediction for a future event. The digital joint-probability forecasting system 102 uses the loss function 802 to select a prediction for a future event to minimize a cost associated with the prediction. For instance, minimizing the cost can include preventing the system 102 from overestimating or underestimating the ground truth value for the future event in accordance with the loss function 802.

In one or more embodiments, the digital joint-probability forecasting system 102 uses a standard loss function such as a quadratic loss function, in which the loss is considered to be proportional to the square of the forecast deviation from ground truth. In particular, the loss function can be represented as L=L(q, s), in which q represents a possible prediction value, and s represents the unknown ground truth value. While FIG. 8A illustrates the loss function at q=2.5, changing the value of q changes the position of the loss function 802 relative to the likelihood function 800.

Alternatively, the digital joint-probability forecasting system 102 can use a custom loss function based on a specific strategic business model or risk analysis. FIG. 8B illustrates the likelihood function 800 and a custom loss function 804. The digital joint-probability forecasting system 102 can use the custom loss function 804 to penalize underestimating the ground truth value for the future event when generating a new prediction, as illustrated. Alternatively, a custom loss function can penalize overestimating the ground truth value for the future event In one or more embodiments, the digital joint-probability forecasting system 102 applies a loss function to the likelihood function by determining a product of the likelihood function and the loss function and integrating over the product. FIG. 8C illustrates a plurality of expected loss functions 806, 808 corresponding to the product of the likelihood function 800 and the loss function 802 or the custom loss function 804, respectively. The digital joint-probability forecasting system 102 uses the corresponding expected loss function to minimize the expected loss when generating the new prediction for the future event. For example, the digital joint-probability forecasting system 102 generates a new prediction q* by minimizing the expected loss $$\int_{-\infty}^{\infty} L(q, s) l(s) ds, \text{ i.e., } q^* = \underset{q \in \mathbb{R}}{\mathrm{argmin}} \int_{-\infty}^{\infty} L(q, s) l(s) ds.$$

Minimizing the expected loss function 806 results in a first ensemble prediction 810, and minimizing the expected loss function 808 results in a second ensemble prediction 812. As described herein, the digital joint-probability forecasting system 102 can apply the loss function to any likelihood function l(s), such as the likelihood functions of FIG. 6 and FIG. 7.

The loss function adds flexibility to customize point forecast according to a strategic business model. To elaborate, for an embodiment in which an analyst requesting the ensemble prediction is making decisions associated with the number or percentage of client devices for customers dropping a digital software subscription service, the analyst may determine that the loss or costs associated with underestimating the number are higher than the loss or costs associated with overestimating the number (since underestimation may lead to a unrealistic high expectation in the market, which in turn leads to a loss in the investors' confidence when the goal is not met). Accordingly, the analyst may establish an asymmetric loss function which places a heavy penalty for underestimating the ground truth value. In particular, the loss function causes the digital joint-probability forecasting system 102 to generate an ensemble point prediction that minimizes the expected loss, which prioritizes the risk of underestimation. FIG. 8C illustrates that a resulting ensemble prediction for the future event is higher for the custom loss function 804 that penalizes underestimation heavily (of FIG. 8B) than for the symmetric loss function 802 illustrated in FIG. 8A, as illustrated by the first ensemble prediction 810 and the second ensemble prediction 812.

In one or more embodiments, the digital joint-probability forecasting system 102 minimizes the subjective or objective loss when generating the ensemble prediction from a likelihood function. Accordingly, the digital joint-probability forecasting system 102 can use any number of criteria in generating ensemble predictions to reduce risk while providing increased accuracy of the ensemble predictions.

An experimental comparison of the ensemble prediction process described herein to conventional, regression-based methods for a five-member ensemble is described below. In particular, the error of each member forecaster is uniform and independent. Thus, the following equation applies to the probability density function for the independent case:

$$p_k(\epsilon_k) = \frac{1}{2\eta_K} (H(\epsilon_k + \eta_k) - H(\epsilon_k - \eta_k))$$

where H is a Heaviside step function, and $\eta_k$ is a half-width of the uniform error listed in Table 1 below. The experiment follows the generalized ensemble prediction process and uses a sinusoidal function to represent the ground truth values for previous events. Additionally, the experiment runs through the time interval $0 < \tau \leq 12$. The training period is $0 < \tau \leq 10$ on 500 observations. The evaluation period is $10 < \tau \leq 12$ on 100 observations.

TABLE 1

List of η (error half-width) for Ensemble Members

| $\eta_1$ | $\eta_2$ | $\eta_3$ | $\eta_4$ | $\eta_5$ |
|---|---|---|---|---|
| 0.2 | 0.25 | 0.28 | 0.7 | 0.26 |

Regression-Based Ensemble Predictions

For the regression-based method, the experiment performed multiple linear regressions using an ordinary least squares ("OLS") estimator on the five ensemble members:

$$a_t = w_1 f_{1t} + w_2 f_{2t} + \ldots + w_5 f_{5t} + \epsilon$$

where ε is assumed to have expectation zero, $w_1, w_2, \ldots, w_5$ represents weight values, and $f_{1t}, f_{2t}, \ldots, f_{5t}$ are the forecasts for time-period t from the five ensemble members. Because all of the ensemble members are assumed to be unbiased, the constraint:

$$w_1 + w_2 + \ldots + w_5 = 1$$

is made to ensure that the ensemble prediction remains unbiased. Furthermore, combining the above two equations yields:

$$(a_t - f_{5t}) = (f_{1t} - f_{5t}) + w_2(f_{2t} - f_{5t}) + \ldots + w_4(f_{4t} - f_{5t}) + \epsilon.$$

Furthermore, the experiment applies OLS regression to find $w_1$ through $w_4$. $w_5$ is found using $w_1 + w_2 + + w_5 = 1$ once the other values have been found. The results are summarized in Table 2. We forecast the ground truth value at time T (a time later than the occurrence of any data points) to be $a_T \sim w_1 f_{1T} + w_2 f_{2T} + \ldots + w_5 f_{5T}$

TABLE 2

List of $w_k$ (weight) for Ensemble Members from OLS Regression

| $w_1$ | $w_2$ | $w_3$ | $w_4$ | $w_5$ |
|---|---|---|---|---|
| 0.3183653 | 0.23285051 | 0.19903305 | 0.02818728 | 0.22129264 |

Joint-Probabilistic Ensemble Forecasting

The experiment implements the ensemble prediction method described herein as follows:

(1) The errors of each member forecaster is collected and the kernel density estimation is applied on each to obtain a single variable probability density function, resulting in five total probability density functions.

(2) At time T, the likelihood function of the ground truth value for the future event is calculated using:

$$l(s) = P(f_{1T}, f_{2T}, \ldots, f_{5T}, s) = p(f_{1T}-s, f_{2T}-s, \ldots, f_{5T}-s) = \Pi_{k=1}^{5} p_k(f_{kT}-s).$$

An illustrative set of ensemble predictions for the ensemble forecasting process described herein is specified by Table 3.

TABLE 3

List of $f_{kT}$ (point forecast from kth forecaster) in FIG. 7

| $f_{1T}$ | $f_{2T}$ | $f_{3T}$ | $f_{4T}$ | $f_{5T}$ | $F_T$ | Ground Truth |
|---|---|---|---|---|---|---|
| −0.634 | −0.764 | −0.689 | −1.11 | −0.361 | −0.573 | −0.558 |

The performance of the two methods (along with that of the best forecaster in the ensemble is summarized in table 4. As shown, the joint-probabilistic method demonstrates greater accuracy and stability than the conventional regression-based method.

TABLE 4

Comparison between different ensemble methods

| | Best Forecaster | Regression-Based | Joint-Probabilistic |
|---|---|---|---|
| Mean Squared Error (MSE) | 0.0145 | 0.0056 | 0.0045 |
| Standard Deviation of Squared Error | 0.013 | 0.0067 | 0.0063 |
| Estimated Standard Deviation of MSE | $5.8 \times 10^{-3}$ | $3 \times 10^{-4}$ | $2.8 \times 10^{-4}$ |

While the joint-probabilistic method described herein provides greater accuracy than conventional methods, as illustrated by the above comparison, the digital joint-probability forecasting system 102 can improve the results by optimizing the kernel size and by collecting additional prediction data. For example, as the forecasters provide more predictions for additional events, the digital joint-probability forecasting system 102 add the predictions to the prediction data used to generate the probability density function(s). Adding new error values to the probability density functions can improve the accuracy of the probability density function in representing the density of the error values and reflect any changes in the accuracy of the forecasters.

Figure 9:
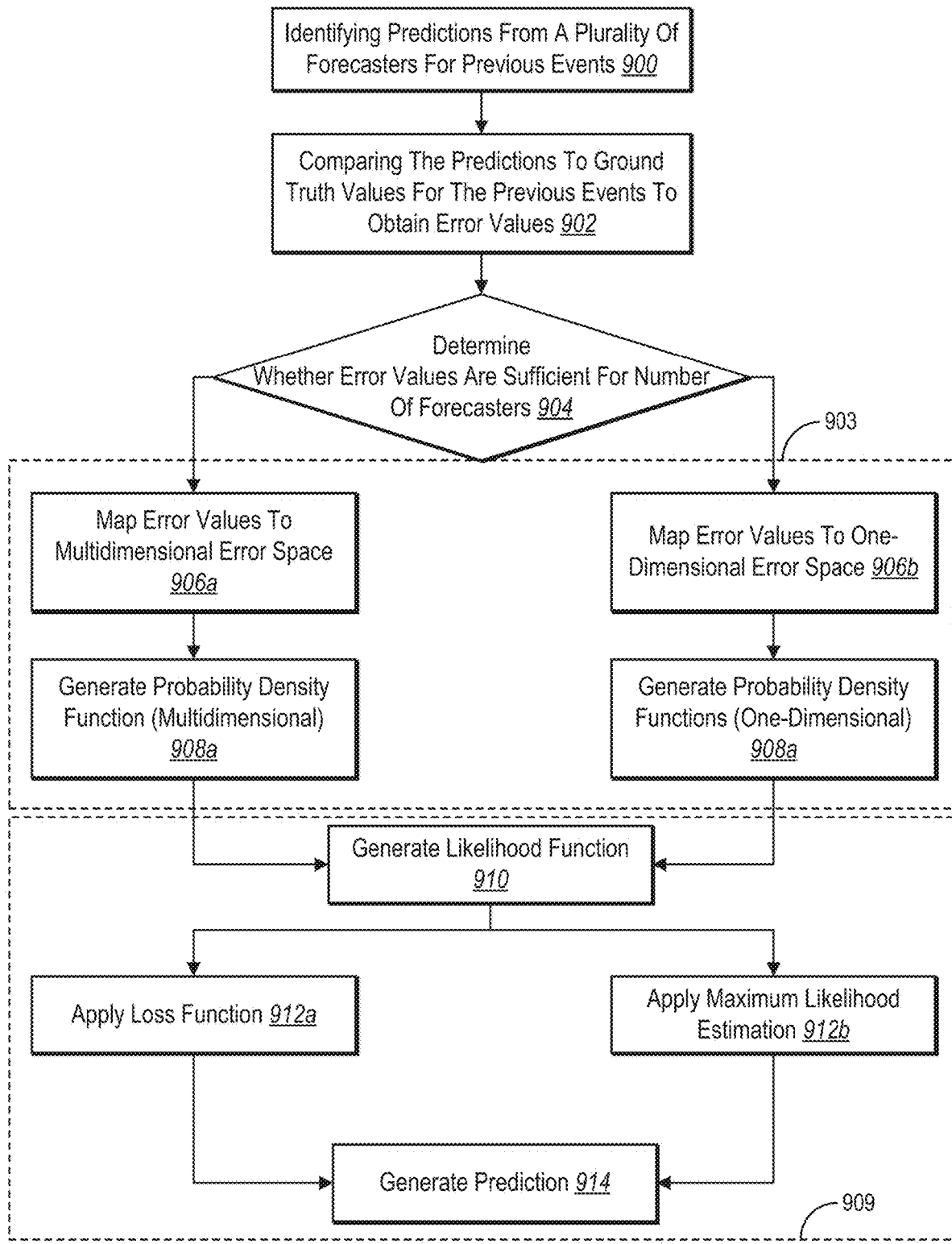
FIG. 9 illustrates a flowchart of an example algorithm for joint-probabilistic ensemble forecasting in accordance with one or more embodiments.

As described above, the digital joint-probability forecasting system 102 can generate ensemble predictions based on a joint probability density function from a multi-dimensional error space or a plurality of probability density functions from a one-dimensional error space representing error values of predictions from a plurality of forecasters. FIG. 9 illustrates a flowchart of an algorithm for generating ensemble predictions from a plurality of forecasters. The process of FIG. 9 begins by the digital joint-probability forecasting system 102 identifying predictions from a plurality of forecasters for previous events 900. The digital joint-probability forecasting system 102 then compares the predictions to ground truth values for the previous events to obtain error values 902. Additionally, the process includes a step 903 for generating at least one probability density function based on the plurality of error values. The process then includes a step 909 for generating a new prediction for a future event utilizing the at least one probability density function.

As described previously, the digital joint-probability forecasting system 102 can identify the predictions from the forecasters for previous events 900 by accessing a forecast history for the forecasters. For instance, the digital joint-probability forecasting system 102 can obtain the forecast history for each of the forecasters individually. Alternatively, the digital joint-probability forecasting system 102 can maintain a database including the forecast history for a plurality of forecasters. The forecast history can include the predictions from the forecasters for a plurality of events that already occurred.

After identifying the predictions for the previous events, the digital joint-probability forecasting system 102 compares the predictions to ground truth values for the previous events to obtain the error values 902. Specifically, the digital joint-probability forecasting system 102 can calculate the error values by determining the difference between the error values and the corresponding ground truth values, which are the actual, measured values for the previous events. Accordingly, the digital joint-probability forecasting system 102 determines a number of error values for each forecaster that corresponds to the number of previous events.

Additionally, the digital joint-probability forecasting system can determine whether the number of error values are sufficient for the number of forecasters 904 for use in generating a multi-dimensional joint probability density function, as described previously with respect to FIG. 3. For example, the digital joint-probability forecasting system 102 can compare the number of error values to a threshold that is determined by the number of forecasters and other factors.

The digital joint-probability forecasting system 102 then proceeds with the step 903 for generating at least one probability density function based on the plurality of error values. As shown in FIG. 9, the digital joint-probability forecasting system 102 maps the error values to a multi-dimensional error space 906a. Specifically, the digital joint-probability forecasting system 102 can map a combined set of error values including error values from each set of forecasters for a previous event to the multi-dimensional error space, as described previously with respect to FIG. 3. For instance, the digital joint-probability forecasting system generates an N-dimensional point in the multi-dimensional error space, where N represents the number of forecasters, and the N-dimensional point is mapped to an N-dimensional error space.

Additionally, the step 903 includes generating a multi-dimensional probability density function 908a based on the plurality of error values mapped to the multi-dimensional error space. The digital joint-probability forecasting system 102 can apply a kernel density estimation to the multi-dimensional error space to generate a probability density function corresponding to the plurality of forecasters, as described previously with respect to FIGS. 3 and 4. For example, the digital joint-probability forecasting system 102 generates an N-dimensional joint probability density function that represents the error distribution associated with the N forecasters.

In addition, as shown in FIG. 9, the digital joint-probability forecasting system can map the error values to a one-dimensional error space 906b. In particular, the digital joint-probability forecasting system 102 can map the error values for each forecaster to a one-dimensional error space so that the error values of each forecaster are mapped separately from each other, as described previously with respect to FIG. 3. Thus, the digital joint-probability forecasting system 102 produces a plurality of individual mappings of one-dimensional error values, where each forecaster is associated with a mapping of error values that correspond to that forecaster.

The digital joint-probability forecasting system 102 then generates probability density functions 908b corresponding to the forecasters. Specifically, the digital joint-probability forecasting system 102 generates the probability density functions by applying a one-dimensional kernel to the one-dimensional error space, as described previously with respect to FIGS. 3 and 6. For instance, the digital joint-probability forecasting system 102 can generate a probability density function for each of the forecasters, resulting in N probability density functions.

After generating the probability density function(s), the digital joint-probability forecasting system 102 performs the step 809 for generating a new prediction for a future event utilizing the at least one probability density function. In one or more embodiments, step 809 includes generating a likelihood function 910 based on the probability density function(s). For example, as described previously with respect to FIG. 6, the digital joint-probability forecasting system 102 can generate the likelihood function based on a probability density function (from a multi-dimensional error space). Alternatively, the digital joint-probability forecasting system 102 can generate the likelihood function based on a plurality of probability density functions (from a one-dimensional error space), as described previously with respect to FIG. 7. In either case the digital joint-probability forecasting system 102 applies the probability density function(s) to a plurality of predictions for the future event from the forecasters to determine the likelihood function, wherein the likelihood function represents probabilities that each possible value of a plurality of possible values correspond to a ground truth value for the future event given the plurality of predictions for the future event.

Additionally, the digital joint-probability forecasting system 102 can predict a ground truth value of the future event by applying a loss function 912a to the likelihood function based on a subjective or objective loss function, as described above with respect to FIGS. 8A-8C. Specifically, the digital joint-probability forecasting system can use a loss function to produce conservative predictions that mitigates the risk of under(over)-estimation. In one or more embodiments, the loss function is provided by a user that requests the ensemble prediction. Alternatively, the digital joint-probability forecasting system 102 can predict a ground truth value of the future event by applying a maximum likelihood estimation 912b to the likelihood function, as described above with respect to FIG. 6. In particular, the digital joint-probability forecasting system 102 can determine the possible value on the likelihood function with the highest probability of being the ground truth value for the future event.

Step 809 then includes generating a prediction 914 from the likelihood function using the applied method above. To illustrate, the digital joint-probability forecasting system 102 identifies a value using the loss function, the maximum likelihood estimation, or both methods, as a likely value for the ground truth value for the future event. Specifically, the digital joint-probability forecasting system 102 generates the prediction for the future event based on the predictions for the future event from the forecasters and the forecast history for the forecasters. Thus, the forecast history influences the ensemble prediction to more accurately predict the ground truth value for the future event.

Figure 10:
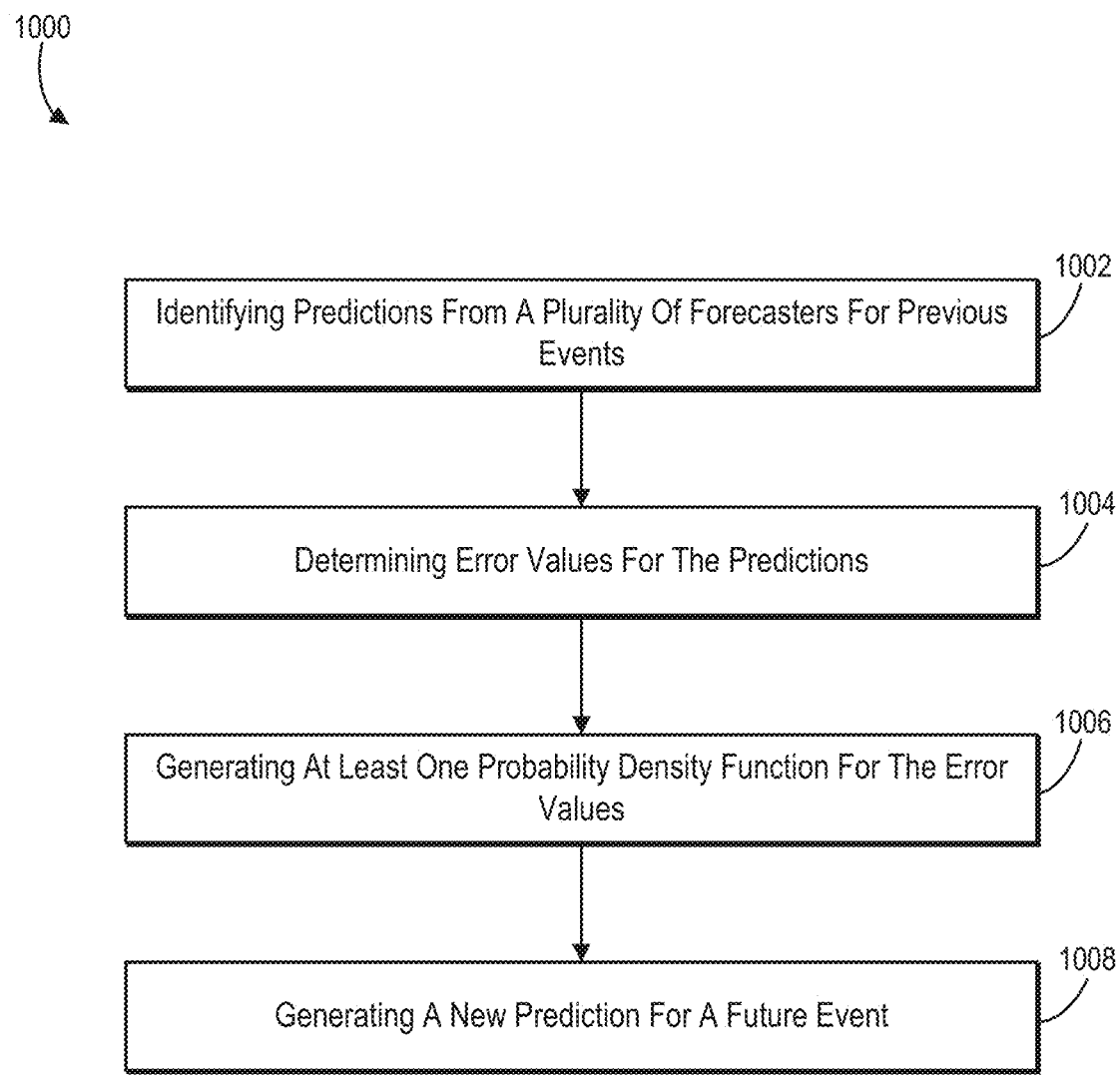
FIG. 10 illustrates a flowchart of a series of acts in a method of joint-probabilistic ensemble forecasting in accordance with one or more embodiments.

Turning now to FIG. 10, this figure illustrates a flowchart of a series of acts 100 of joint-probabilistic ensemble forecasting in accordance with one or more embodiments. While FIG. 10 illustrates acts according to one embodiment, alternative embodiments may omit, add to, reorder, and/or modify any of the acts shown in FIG. 10. The acts of FIG. 10 can be performed as part of a method. Alternatively, a non-transitory computer readable medium can comprise instructions, that when executed by one or more processors, cause a computing device to perform the acts of FIG. 10. In still further embodiments, a system can perform the acts of FIG. 10.

The series of acts 1000 includes an act 1002 of identifying predictions from a plurality of forecasters for previous events. For example, act 1002 involves identifying a plurality of predictions from a plurality of forecasters for a plurality of previous events, wherein each prediction for each previous event from each forecaster has a corresponding prediction for the previous event from every other forecaster of the plurality of forecasters. Act 1002 can involve accessing the plurality of predictions from a forecast history in a database associated with the plurality of forecasters.

The series of acts 1000 also includes an act 1004 of determining error values for the predictions. For example, act 1004 involves determining a plurality of error values for the plurality of predictions by comparing the plurality of predictions to a plurality of ground truth values for the plurality of previous events. Act 1004 can involve determining an error value from the plurality of error values by determining a difference between a prediction for a previous event from the plurality of previous events and a ground truth value for the previous event.

As part of act 1004, or as an additional act, the series of acts 1000 can include mapping a combined set of error values from each forecaster for a previous event for the plurality of forecasters to a multi-dimensional error space. Alternatively, the series of acts 1000 can include mapping error values from each forecaster to a one-dimensional error space. For example, the series of acts 1000 can include mapping the error values from each forecaster to the one-dimensional error space in response to determining that a total number of error values for the plurality of forecasters does not meet a threshold.

Additionally, the series of acts 1000 includes an act 1006 of generating at least one error probability density function for the error values. For example, act 1006 involves generating at least one error probability density function by mapping error values of the plurality of error values from each forecaster to an error space and applying a kernel density estimation to the error space. Act 1006 can involve applying the kernel density estimation using an Epanechnikov kernel.

Act 1006 can involve mapping a combined set of error values from the plurality of forecasters for a previous event to a multi-dimensional error space, and applying the kernel density estimation to the combined set in the multi-dimensional error space to generate a joint error probability density function.

Act 1006 can involve generating a plurality of error probability density functions from the error values in the one-dimensional error space, wherein each error probability density functions reflects error values of a forecaster from the plurality of forecasters. Furthermore, act 1006 can involve generating, utilizing the plurality of error probability density functions, a combined likelihood function for generating the new prediction for the future event.

The series of acts 1000 also includes an act 1008 of generating a new prediction for a future event. For example, act 1008 involves utilizing the at least one error probability density function and a plurality of predictions for a future event from the plurality of forecasters to generate a new prediction for the future event. Act 1006 can involve generating, utilizing the at least one error probability density function, a likelihood function representing probabilities that each possible value of a plurality of possible values correspond to a ground truth value for the future event. Act 908 can involve generating the new prediction for the future event by maximizing the likelihood function. For example, act 1008 can involve applying a maximum likelihood estimation to the likelihood function.

Act 1008 can involve identifying a loss function representing a cost associated with the future event for the plurality of possible values, and utilizing the loss function with the likelihood function to generate the new prediction. For example, act 1008 can involve generating the loss function by generating an asymmetrical loss function that constrains the new prediction to a value above or below a maximum value on the likelihood function.

Figure 11:
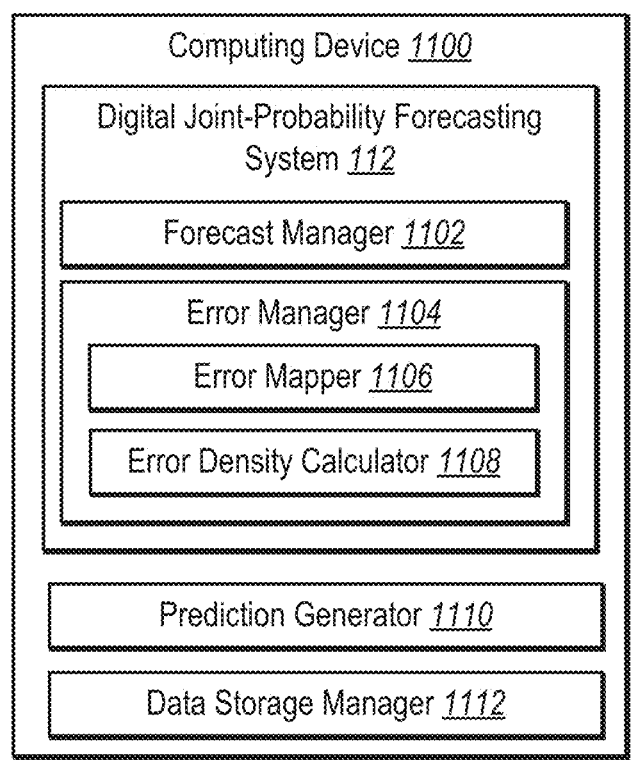
FIG. 11 illustrates a schematic diagram of the digital joint-probability forecasting system of FIG. 1 in accordance with one or more embodiments.

FIG. 11 illustrates a detailed schematic diagram of an embodiment of the digital joint-probability forecasting system 102 of FIG. 1. As shown, the digital joint-probability forecasting system 102 can be part of computing device(s) 1100. Additionally, the digital joint-probability forecasting system 102 can include, but is not limited to, a forecast manager 1102, an error manager 1104 including an error mapper 1106 and an error density calculator 1108, a prediction generator 1110, and a data storage manager 1112. The digital joint-probability forecasting system 102 can be implemented on any number of computing devices (e.g., the server(s) 104 and/or the analyst device 108). For example, the digital joint-probability forecasting system can be implemented in a distributed system of server devices for generating ensemble predictions based on predictions from a plurality of forecasters. Alternatively, the digital joint-probability forecasting system 102 can be implemented on a single computing device such as a client device of a user.

In one or more embodiments, each of the components of the digital joint-probability forecasting system 102 are in communication with one another using any suitable communication technologies. Additionally, the components of the digital joint-probability forecasting system 102 can be in communication with one or more other devices including a client device of a user and forecaster systems, as illustrated in FIG. 1. It will be recognized that although the components of the digital joint-probability forecasting system 102 are shown to be separate in FIG. 10, any of the subcomponents may be combined into fewer components, such as into a single component, or divided into more components as may serve a particular implementation. Furthermore, although the components of FIG. 10 are described in connection with the digital joint-probability forecasting system 102, at least some of the components for performing operations in conjunction with the digital joint-probability forecasting system 102 described herein may be implemented on other devices within the environment.

The components of the digital joint-probability forecasting system 102 can include software, hardware, or both. For example, the components of the digital joint-probability forecasting system 102 can include one or more instructions stored on a computer-readable storage medium and executable by processors of one or more computing devices (e.g., the computing device(s) 1000). When executed by the one or more processors, the computer-executable instructions of the digital joint-probability forecasting system 102 can cause the computing device(s) 1000 to perform the asset management methods described herein. Alternatively, the components of the digital joint-probability forecasting system 102 can comprise hardware, such as a special purpose processing device to perform a certain function or group of functions. Additionally or alternatively, the components of the digital joint-probability forecasting system 102 can include a combination of computer-executable instructions and hardware.

Furthermore, the components of the digital joint-probability forecasting system 102 performing the functions described herein with respect to the digital joint-probability forecasting system 102 may, for example, be implemented as part of a stand-alone application, as a module of an application, as a plug-in for applications including content management applications, as a library function or functions that may be called by other applications, and/or as a cloud-computing model. Thus, the components of the digital joint-probability forecasting system 102 may be implemented as part of a stand-alone application on a personal computing device or a mobile device. Alternatively or additionally, the components of the digital joint-probability forecasting system 102 may be implemented in any application that allows creation and delivery of marketing content to users, including, but not limited to, applications in ADOBE ANALYTICS CLOUD, such as ADOBE ANALYTICS, ADOBE AUDIENCE MANAGER, ADOBE CAMPAIGN, ADOBE EXPERIENCE MANAGER, ADOBE MEDIA OPTIMIZER, ADOBE PRIMETIME, ADOBE SOCIAL, and ADOBE TARGET. "ADOBE", "ADOBE ANALYTICS CLOUD", "ADOBE ANALYTICS", "ADOBE AUDIENCE MANAGER", "ADOBE CAMPAIGN", "ADOBE EXPERIENCE MANAGER", "ADOBE PRIMETIME", "ADOBE SOCIAL", and "ADOBE TARGET" are registered trademarks of Adobe Systems Incorporated in the United States and/or other countries.

As mentioned, the digital joint-probability forecasting system 102 can also include a forecast manager 1102 to facilitate management of predictions and forecast data from a plurality of forecasters. Specifically, the forecast manager 1102 can communicate with the plurality of forecasters to obtain predictions for a plurality of previous events. Additionally, the forecast manager 1102 can communicate with the data storage manager 1112 to store predictions for previous events for later use. The forecast manager 1102 can also manage information about the forecasters to tie each of the predictions to the corresponding forecasters.

The digital joint-probability forecasting system also includes an error manager 1104 that manages errors associated with predictions from the plurality of forecasters. In particular, the error manager 1104 determines the error values for the plurality of predictions by comparing the predictions to ground truth values for a plurality of corresponding previous events. For example, the error manager 1104 can collect the ground truth values for the previous events and then determine the differences (i.e., the values) between the predictions and the corresponding ground truth values.

Additionally, the error manager 1104 includes an error mapper 1106 that facilitates the mapping of error values to an error space. For instance, the error mapper 1106 can map the error values corresponding to the plurality of forecasters to a multi-dimensional error space by mapping a combined set of error values to the multi-dimensional error space. Alternatively, the error mapper 1106 can map the error values to a one-dimensional error space by mapping each error value separately to the one-dimensional error space. The error mapper 1106 can determine whether to map the error values to the multi-dimensional error space or the one-dimensional error space based on the number of error values and/or the number of forecasters, among other factors.

The error manager 1104 also includes an error density calculator 1108 for generating one or more error probability density functions from the error space to which the error mapper 1106 has mapped the error values. In particular, the error density calculator 1108 generates an error probability density function or a plurality of error probability density functions based on whether the error values are mapped to a multi-dimensional error space or a one-dimensional error space. For example, the error density calculator 1108 generates the error probability density function(s) by applying a kernel density estimation to the error space to smoothen the distribution of error values within the error space, thereby creating one or more continuous error probability density functions.

The digital joint-probability forecasting system 102 also includes a prediction generator 1110 to generate predictions for future events based on the predictions of the plurality of forecasters for the future events. Specifically, the prediction generator 1110 generates a likelihood function based on the error probability density function(s) to represent the probabilities of a plurality of possible values being a ground truth value for the future event. For instance, the prediction generator 1110 generates the likelihood function by applying the error probability density function(s) to the predictions for the future event.

The prediction generator 1110 then generates a prediction for the future event from the likelihood function. In particular, the prediction generator 1110 generates an ensemble prediction that takes into account predictions from the forecasters for the future event, as well as the predictions from the forecasters for a plurality of previous events. For example, the prediction generator 1110 can apply a maximum likelihood estimation to the likelihood function to determine the possible value with the highest probability of being the ground truth value for the future event. The prediction generator 1110 can also use a loss function based on cost in connection with the likelihood function to generate the prediction within one or more constraints.

The digital joint-probability forecasting system 102 also includes a data storage manager 1112 that stores and maintains data associated with joint-probabilistic ensemble predictions. For example, the data storage manager 1112 can include a database that maintains a forecast history including predictions for a plurality of previous events. The data storage manager 1112 can also include information about the forecasters to allow the digital joint-probability forecasting system 102 to obtain predictions from the forecasters for future events. The data storage manager 1112 can include, or communicate with, one or more non-transitory computer readable storage devices. For example, the data storage manager 1112 can communicate with a distributed storage environment to store information associated with a forecast history, error probability density functions, likelihood functions, and ensemble predictions.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
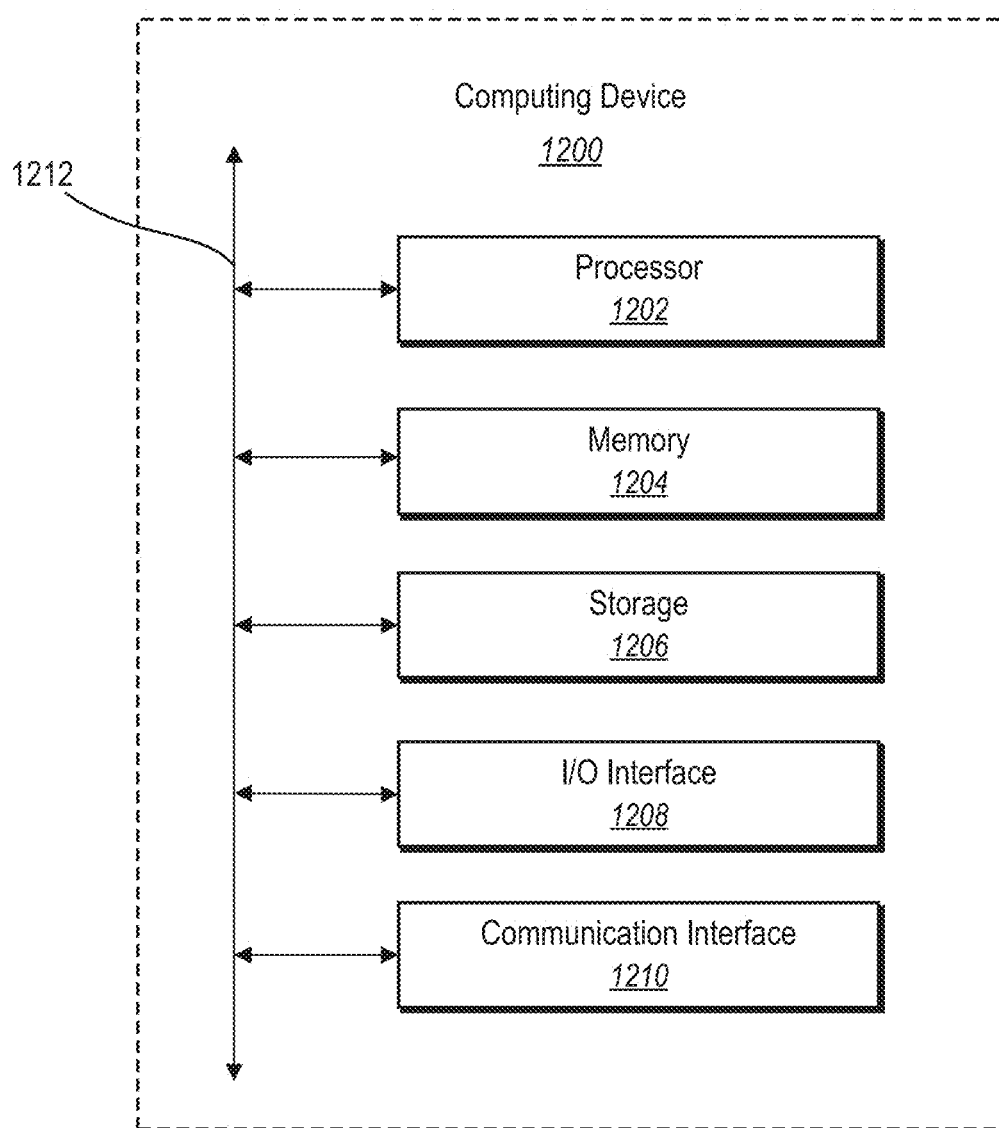
FIG. 12 illustrates a block diagram of an exemplary computing device in accordance with one or more embodiments.

FIG. 12 illustrates a block diagram of exemplary computing device 1200 that may be configured to perform one or more of the processes described above. One will appreciate that one or more computing devices such as the computing device 1200 may implement the digital joint-probability forecasting system 102. As shown by FIG. 12, the computing device 1200 can comprise a processor 1202, a memory 1204, a storage device 1206, an I/O interface 1208, and a communication interface 1210, which may be communicatively coupled by way of a communication infrastructure 1212. In certain embodiments, the computing device 1200 can include fewer or more components than those shown in FIG. 12. Components of the computing device 1200 shown in FIG. 12 will now be described in additional detail.

In one or more embodiments, the processor 1202 includes hardware for executing instructions, such as those making up a computer program. As an example and not by way of limitation, to execute instructions for dynamically modifying workflows, the processor 1202 may retrieve (or fetch) the instructions from an internal register, an internal cache, the memory 1204, or the storage device 1206 and decode and execute them. The memory 1204 may be a volatile or non-volatile memory used for storing data, metadata, and programs for execution by the processor(s). The storage device 1206 includes storage, such as a hard disk, flash disk drive, or other digital storage device, for storing data or instructions for performing the methods described herein.

The I/O interface 1208 allows a user to provide input to, receive output from, and otherwise transfer data to and receive data from computing device 1200. The I/O interface 1208 may include a mouse, a keypad or a keyboard, a touch screen, a camera, an optical scanner, network interface, modem, other known I/O devices or a combination of such I/O interfaces. The I/O interface 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1208 is configured to provide graphical data to a display for presentation to a user. The graphical data may be representative of one or more graphical user interfaces and/or any other graphical content as may serve a particular implementation.

The communication interface 1210 can include hardware, software, or both. In any event, the communication interface 1210 can provide one or more interfaces for communication (such as, for example, packet-based communication) between the computing device 1200 and one or more other computing devices or networks. As an example and not by way of limitation, the communication interface 1210 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1210 may facilitate communications with various types of wired or wireless networks. The communication interface 1210 may also facilitate communications using various communication protocols. The communication infrastructure 1212 may also include hardware, software, or both that couples components of the computing device 1200 to each other. For example, the communication interface 1210 may use one or more networks and/or protocols to enable a plurality of computing devices connected by a particular infrastructure to communicate with each other to perform one or more aspects of the processes described herein. To illustrate, the asset and attribute management process can allow a plurality of devices (e.g., a client device and server devices) to exchange information using various communication networks and protocols for sharing information such as assets, attributes, marketing content, and analytics data.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. In a digital medium environment for generating digital prediction models, a computer-implemented method of joint-probabilistic ensemble forecasting comprising:
   receiving, by one or more servers via a network, a plurality of predictions from a plurality of forecaster systems for a plurality of previous events, wherein each prediction for each previous event from each forecaster system has a corresponding prediction for the previous event from every other forecaster system of the plurality of forecaster systems;
   receiving, from a client device via the network, a request to generate an ensemble prediction for a subset of the plurality of forecaster systems;
   determining a plurality of error values for a subset of the plurality of predictions corresponding to the subset of the plurality of forecaster systems by comparing the subset of the plurality of predictions to a plurality of ground truth values for the plurality of previous events; and
   generating, for the plurality of forecaster systems, a plurality of probability density functions by mapping error values of the plurality of error values from each forecaster system of the subset of the plurality of forecaster systems to a one-dimensional error space and applying a kernel density estimation to the plurality of error values in the one-dimensional error space;
   determining a plurality of initial likelihood functions by modifying the plurality of probability density functions utilizing a plurality of predictions for a future event from the subset of the plurality of forecaster systems;
   generating a combined likelihood function corresponding to the plurality of predictions for the future event by combining the plurality of initial likelihood functions;
   generating, by the one or more servers in response to the request by the client device to generate an ensemble prediction for the subset of the plurality of forecaster systems, a new prediction for the future event utilizing the combined likelihood function; and
   providing the new prediction for the future event for display at the client device.

2. The computer-implemented method as recited in claim 1, wherein generating the combined likelihood function comprises determining a product of the plurality of initial likelihood functions.

3. The computer-implemented method as recited in claim 1, further comprising generating the plurality of probability density functions by applying a one-dimensional kernel to error values from a forecaster system of the subset of the plurality of forecaster systems to generate a single-variable error probability density function.

4. The computer-implemented method as recited in claim 1, wherein generating the new prediction for the future event comprises performing a maximum likelihood estimation on the combined likelihood function representing probabilities that each possible value of a plurality of possible values correspond to a ground truth value for the future event.

5. The computer-implemented method as recited in claim 4, further comprising minimizing a cost in connection with the combined likelihood function and a loss function.

6. The computer-implemented method as recited in claim 5, wherein the loss function comprises an asymmetrical loss function that penalizes one of overestimating or underestimating a ground truth value for the future event.

7. A non-transitory computer readable storage medium comprising instructions that, when executed by at least one processor, cause a computer system to:
   receive, by one or more servers via a network, a plurality of predictions from a plurality of forecaster systems for a plurality of previous events, wherein each prediction for each previous event from each forecaster system has a corresponding prediction for the previous event from every other forecaster system of the plurality of forecaster systems;
   receive, from a client device via the network, a request to generate an ensemble prediction for a subset of the plurality of forecaster systems;
   determine a plurality of error values for a subset of the plurality of predictions corresponding to the subset of the plurality of forecaster systems by comparing the subset of the plurality of predictions to a plurality of ground truth values for the plurality of previous events;
   generate, for the plurality of forecaster systems, a plurality of probability density functions by mapping error values of the plurality of error values from each forecaster system of the subset of the plurality of forecaster systems to a one-dimensional error space and applying a kernel density estimation to the plurality of error values in the one-dimensional error space;
   determine a plurality of initial likelihood functions by modifying the plurality of probability density functions utilizing a plurality of predictions for a future event from the subset of the plurality of forecaster systems;
   generate a combined likelihood function corresponding to the plurality of predictions for the future event by combining the plurality of initial likelihood functions;
   generate, by the one or more servers in response to the request by the client device to generate an ensemble prediction for the subset of the plurality of forecaster systems, a new prediction for the future event utilizing the combined likelihood function, and
   provide the new prediction for the future event for display at the client device.

8. The non-transitory computer readable storage medium as recited in claim 7, further comprising instructions that, when executed by the at least one processor, cause the computer system to generate the combined likelihood function by determining a product of the plurality of initial likelihood functions.

9. The non-transitory computer readable storage medium as recited in claim 7, further comprising instructions that, when executed by the at least one processor, cause the computer system to generate the plurality of probability density functions by applying a one-dimensional kernel to error values from a forecaster system of the subset of the plurality of forecaster systems to generate a single-variable error probability density function.

10. The non-transitory computer readable storage medium as recited in claim 7, further comprising instructions that, when executed by the at least one processor, cause the computer system to map the error values from each forecaster system to the one-dimensional error space in response to determining that a total number of error values for the subset of the plurality of forecaster systems does not meet a threshold.

11. The non-transitory computer readable storage medium as recited in claim 7, wherein a probability density function of the plurality of probability density functions represents an error value distribution corresponding to a single forecaster system of the subset of the plurality of forecaster systems.

12. The non-transitory computer readable storage medium as recited in claim 7, further comprising instructions that, when executed by the at least one processor, cause the computer system to determine the combined likelihood function by determining probabilities a plurality of possible values correspond to a ground truth value for the future event.

13. The non-transitory computer readable storage medium as recited in claim 12, further comprising instructions that, when executed by the at least one processor, cause the computer system to generate the new prediction for the future event by maximizing the combined likelihood function.

14. The non-transitory computer readable storage medium as recited in claim 12, further comprising instructions that, when executed by the at least one processor, cause the computer system to generate the new prediction for the future event by:
   identifying a loss function representing a cost associated with the future event for the plurality of possible values; and
   utilizing the loss function with the combined likelihood function to generate the new prediction.

15. The non-transitory computer readable storage medium as recited in claim 14, further comprising instructions that, when executed by the at least one processor, cause the computer system to generate the new prediction by generating an asymmetrical loss function that constrains the new prediction to a value above or below a maximum value on the combined likelihood function.

16. In a digital medium environment for generating digital prediction models, a system for join-probabilistic ensemble forecasting comprising:
   at least one processor; and
   a non-transitory computer memory comprising instructions that, when executed by the at least one processor, cause the system to:
      receive, by one or more servers via a network, a plurality of predictions for a plurality of previous events from a plurality of forecaster systems, wherein each previous event has a corresponding prediction from each forecaster system of the plurality of forecaster systems;
      receive, from a client device via the network, a request to generate an ensemble prediction for a subset of the plurality of forecaster systems;
      determine a plurality of error values for a subset of the plurality of predictions from the subset of the plurality of forecaster systems by comparing the subset of the plurality of predictions to a plurality of ground truth values for the plurality of previous events;
      generate an error probability density function representing the plurality of error values from the subset of the plurality of forecaster systems by applying a kernel density estimation to the plurality of error values;
      determine a plurality of predictions for a future event from the subset of the plurality of forecaster systems;
      generate a likelihood function from the error probability density function by determining a profile of the error probability density function along a line of unit slope corresponding to the plurality of predictions; and
      generate a new prediction for the future event based on the likelihood function.

17. The system as recited in claim 16, further comprising instructions that, when executed by the at least one processor, cause the system to generate the error probability density function by:
   mapping a combined set of the plurality of error values from the subset of the plurality of forecaster systems for a previous event from the plurality of previous events to a multi-dimensional error space; and
   applying the kernel density estimation to the combined set in the multi-dimensional error space to generate a joint error probability density function.

18. The system as recited in claim 17, wherein:
   the subset of the plurality of forecaster systems has a particular number of forecaster systems and the multi-dimensional error space has a number of dimensions equal to the particular number of forecaster systems; and
   the instructions that cause the system to map the combined set of the plurality of error values to the multi-dimensional error space further cause the system to assign the combined set of the plurality of error values to a multi-dimensional point in the multi-dimensional error space.

19. The system as recited in claim 17, further comprising instructions that, when executed by the at least one processor, cause the system to generate the likelihood function by applying the joint error probability density function to the plurality of predictions for the future event, wherein the likelihood function represents probabilities that each possible value of a plurality of possible values correspond to a ground truth value for the future event given the plurality of predictions for the future event.

20. The system as recited in claim 16, further comprising instructions that, when executed by the at least one processor, cause the system to generate the new prediction by maximizing the likelihood function or minimizing a cost in connection with the likelihood function and a loss function.

* * * * *